United States Patent
Kagawa et al.

(10) Patent No.: US 9,681,072 B2
(45) Date of Patent: Jun. 13, 2017

(54) SOLID-STATE IMAGE PICKUP DEVICE WITH AVERAGING OF SIGNALS FROM INDIVIDUAL PIXELS

(71) Applicant: NATIONAL UNIVERSITY CORPORATION SHIZUOKA UNIVERSITY, Shizuoka-shi, Shizuoka (JP)

(72) Inventors: Keiichiro Kagawa, Hamamatsu (JP); Shoji Kawahito, Hamamatsu (JP)

(73) Assignee: NATIONAL UNIVERSITY CORPORATION SHIZUOKA UNIVERISTY (JP)

( * ) Notice: Subject to any disclaimer, the term of this patent is extended or adjusted under 35 U.S.C. 154(b) by 58 days.

(21) Appl. No.: 14/420,172

(22) PCT Filed: Aug. 7, 2013

(86) PCT No.: PCT/JP2013/071372
§ 371 (c)(1),
(2) Date: Feb. 6, 2015

(87) PCT Pub. No.: WO2014/024922
PCT Pub. Date: Feb. 13, 2014

(65) Prior Publication Data
US 2015/0215549 A1    Jul. 30, 2015

(30) Foreign Application Priority Data

Aug. 7, 2012  (JP) .................................. 2012-175364

(51) Int. Cl.
*H04N 5/357* (2011.01)
*H04N 5/374* (2011.01)
(Continued)

(52) U.S. Cl.
CPC ........... *H04N 5/357* (2013.01); *H04N 3/1593* (2013.01); *H04N 5/243* (2013.01); *H04N 5/341* (2013.01);
(Continued)

(58) Field of Classification Search
CPC ........ H04N 5/357; H04N 5/374; H04N 5/243; H04N 5/359; H04N 5/361; H04N 5/341
(Continued)

(56) References Cited

U.S. PATENT DOCUMENTS 5,978,519 A * 11/1999 Bollman ................. G06T 7/004
382/270
7,336,841 B2 * 2/2008 Neogi ................... H04N 19/467
375/E7.089
(Continued)

FOREIGN PATENT DOCUMENTS

JP    2000-032354    1/2000
JP    2003-283907    10/2003
(Continued)

OTHER PUBLICATIONS

PCT/IB/338 Notification of Transmittal of Translation of the International Preliminary Report on Patentability in counterpart International Application No. PCT/JP2013/071372 dated Feb. 12, 2015.
(Continued)

*Primary Examiner* — Antoinette Spinks
(74) *Attorney, Agent, or Firm* — Ostrolenk Faber LLP

(57) ABSTRACT

A solid-state image pickup device 1A includes an image pickup section 2 having a pixel array P in which a pixel C is two-dimensionally arranged, a lens section 3 having a plurality of lenses 3a arranged on the pixel array P, and an image generating section 4A for generating an image by using an electrical signal SE. The image pickup section 2 has a plurality of the pixel arrays P including one image pickup region T. The image generating section 4A generates the image by averaging the electrical signals SE for each pixel
(Continued)

C corresponding to one another among the image pickup regions T, in order to reduce noise present in the electrical signal SE.

11 Claims, 21 Drawing Sheets

(51) Int. Cl.
| | |
|---|---|
| H04N 3/14 | (2006.01) |
| H04N 5/243 | (2006.01) |
| H04N 5/341 | (2011.01) |
| H04N 5/359 | (2011.01) |
| H04N 5/361 | (2011.01) |
| H04N 5/3745 | (2011.01) |

(52) U.S. Cl.
CPC .............. *H04N 5/359* (2013.01); *H04N 5/361* (2013.01); *H04N 5/374* (2013.01); *H04N 5/3745* (2013.01); *H04N 5/3415* (2013.01); *H04N 2209/048* (2013.01)

(58) Field of Classification Search
USPC ......................................................... 348/241
See application file for complete search history.

(56) References Cited

U.S. PATENT DOCUMENTS 9,357,144 B2 * 5/2016 Hara ...................... H04N 5/357
2003/0214600 A1 * 11/2003 Kido ...................... H04N 5/235
   348/362
2004/0006270 A1 * 1/2004 Jeong .................... A61B 5/0051
   600/442
2007/0177759 A1 * 8/2007 Eschbach .............. G06T 1/0028
   382/100
2010/0271512 A1 * 10/2010 Garten .................... G09G 5/06
   348/239
2011/0242381 A1 * 10/2011 Sakakibara ............ H04N 5/355
   348/301
2014/0300608 A1 * 10/2014 Patil ......................... G06T 5/50
   345/442
2015/0193937 A1 * 7/2015 Georgiev .............. G06T 7/0065
   382/168

FOREIGN PATENT DOCUMENTS

| JP | 2003-333416 | 11/2003 |
|---|---|---|
| JP | 2004-146619 | 5/2004 |
| JP | 2004-165913 | 6/2004 |
| JP | 2008-259171 | 10/2008 |
| JP | 2011-229120 | 11/2011 |

OTHER PUBLICATIONS

International Search Report mailed Oct. 15, 2013 in corresponding PCT International Application No. PCT/JP2013/071372.

* cited by examiner

Fig.9
(a)
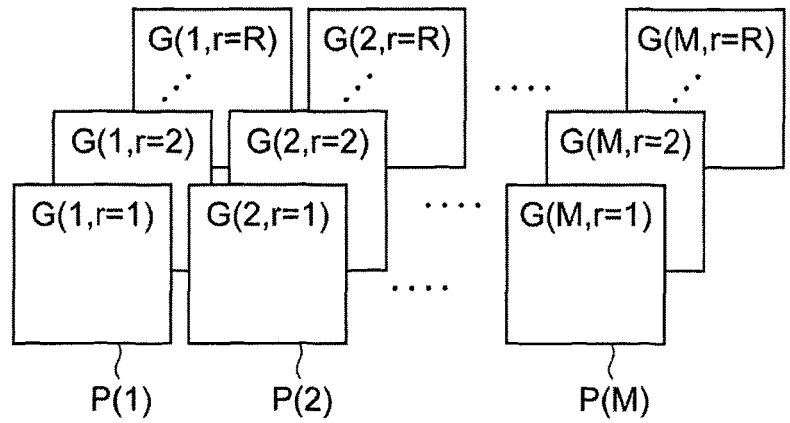
(b)
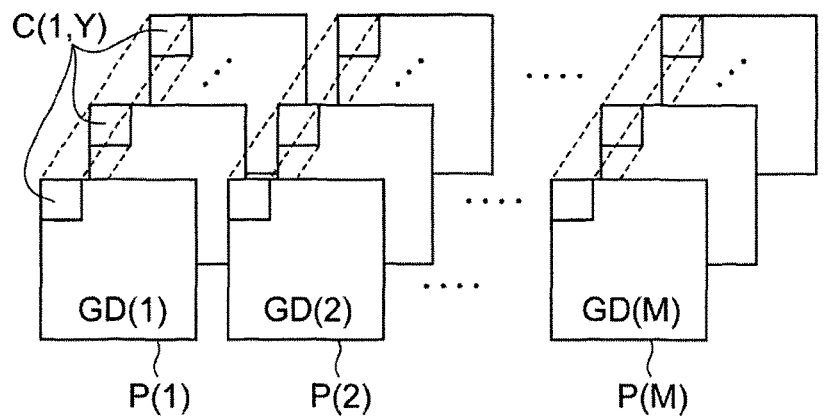
(c)
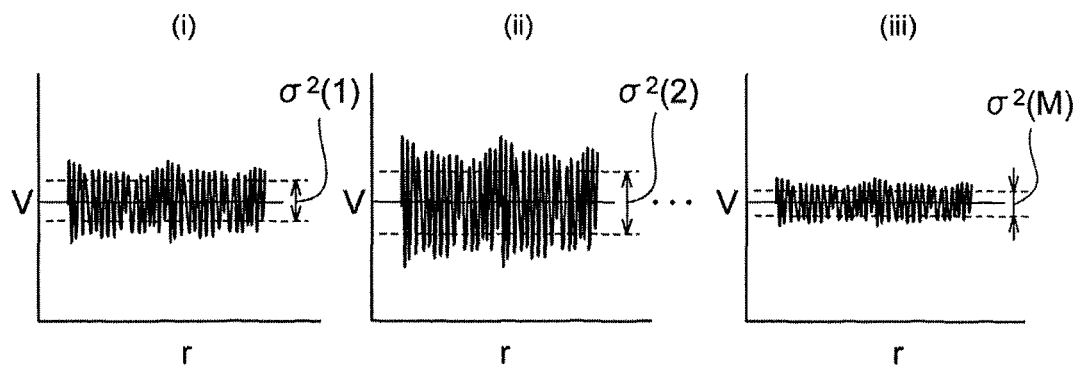

*Fig.10*
(a)
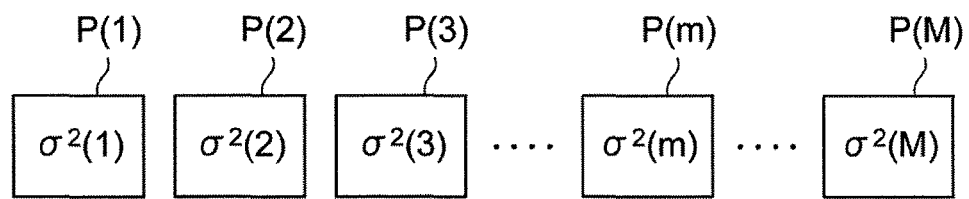
(b)
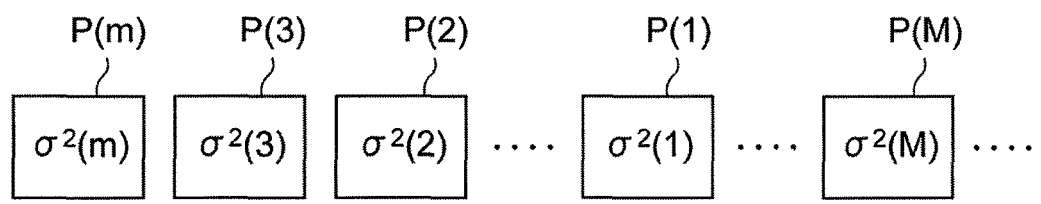

Fig.16
(a)
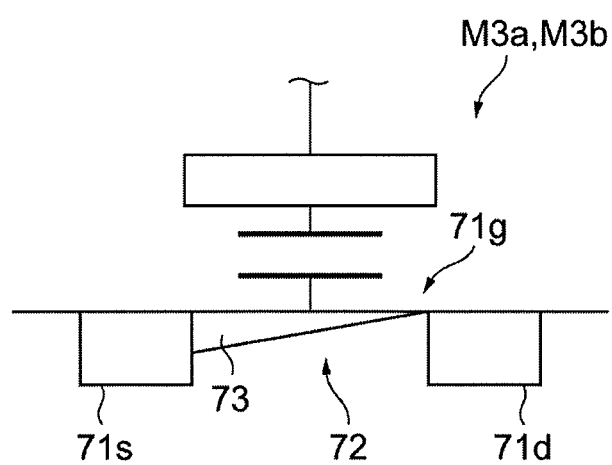
(b)
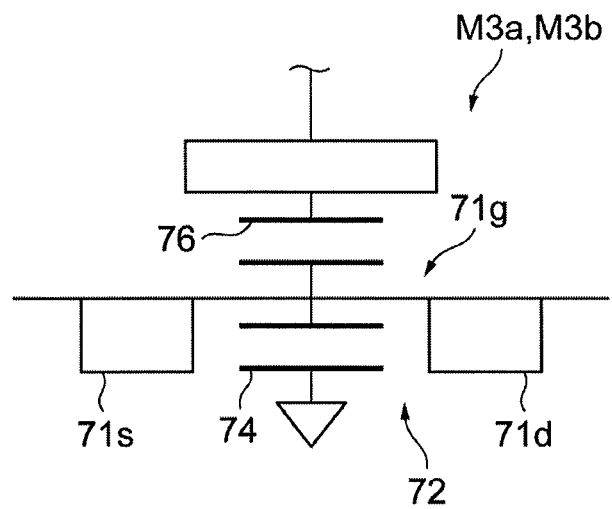

*Fig.19*
(a)
(b)
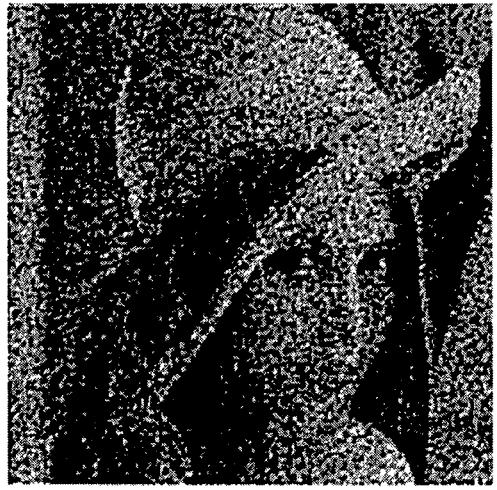
(c)
(d)

SOLID-STATE IMAGE PICKUP DEVICE WITH AVERAGING OF SIGNALS FROM INDIVIDUAL PIXELS

CROSS-REFERENCE TO RELATED APPLICATIONS

The present application is a 35 U.S.C. §§371 national phase conversion of PCT/JP2013/071372, filed Aug. 7, 2013, which claims priority to Japanese Patent Application No. P2012-175364, filed Aug. 7, 2012, the contents of both of which are incorporated herein by reference. The PCT International Application was published in the Japanese language.

TECHNICAL FIELD

The present invention relates to a solid-state image pickup device.

BACKGROUND ART

Patent Literature 1 describes a solid-state image pickup device having a configuration of removing a random noise of a video signal. The solid-state image pickup device is provided with a pixel array, and an output circuit for reading out a video signal from the pixel array. The solid-state image pickup device includes a pixel array to which two output circuits are connected. The two video signals output from the two output circuits are subject to processing such as averaging, and noise is thereby removed from the video signal.

Patent Literature 2 describes an image pickup device capable of reducing the thickness of a device. The image pickup device is provided with a plurality of region sensors, and a plurality of microlenses for forming a subject image onto each of the region sensors. The subject image formed onto the region sensor is a whole image of the subject. The plurality of microlenses have respectively different focal lengths. When the image is generated, output from the region sensor onto which a subject image having an appropriate focal length is formed is used. Therefore, it becomes possible to eliminate a movement mechanism of a microlens for performing a focal adjustment, and it is thus possible to reduce the thickness of a device.

Patent Literature 3 describes an image input device capable of acquiring a high resolution image even when a distance between a subject and a microlens array is large. The image input device is provided with a plurality of configurations where a microlens and a light-receiving cell onto which a subject image corresponding to a microlens is formed are combined. A relative positional relationship between the microlens and the light-receiving cell differs for each combination. Therefore, even when the distance between the subject and the microlens is large, it is possible to improve the resolution of an image because a different subject image is formed onto each light-receiving cell.

Patent Literature 4 describes a system for acquiring a three-dimensional light field. This system is a three-dimensional display system which can be used for a television and a digital entertainment where three-dimensional light field data is needed.

CITATION LIST

Patent Literature

Patent Literature 1: Japanese Patent Application Laid-Open No. 2004-165913
Patent Literature 2: Japanese Patent Application Laid-Open No. 2004-146619
Patent Literature 3: Japanese Patent Application Laid-Open No. 2000-32354
Patent Literature 4: Japanese Patent Application Laid-Open No. 2008-259171

SUMMARY OF INVENTION

Technical Problem

In an image pickup system such as a digital camera and a camcorder, it is still an unresolved significant challenge to satisfy all the requirements such as a low noise, a high sensitivity, and a high dynamic range. In the image pickup system, it is desired to realize a noise level by which one photon can be identified. This requires, as input referred noise, a noise level of 0.1 electrons rms (in the case of quantum efficiency 100%, 0.1 rms in terms of a photon) including noise of an analog-to-digital converter, etc. However, a currently commercially available device still has a noise level of about 1 electrons rms.

In view of the above-described problems, it is an object of the present invention to provide a solid-state image pickup device capable of reducing noise.

Solution to Problem

A solid-state image pickup device according to one aspect of the present invention includes: an image pickup section having a pixel array in which pixels for providing, via a transistor, an electrical signal corresponding to received light are two-dimensionally arranged; a lens section having a plurality of lenses arranged on the pixel array; and an image generating section for generating an image by using the electrical signal, wherein the image pickup section includes one pixel array including a plurality of image pickup regions onto which a subject image is formed by the lens section or a plurality of the pixel arrays including the one image pickup region, and the image generating section generates the image by averaging the electrical signals for each pixel corresponding to one another among the image pickup regions, in order to reduce noise present in the electrical signal.

The solid-state image pickup device has a multi-aperture structure including a plurality of lenses, and thus, it is possible to obtain a multi-aperture image formed of image data obtained by imaging a subject image. In the image generating section, the signals are averaged for each pixel corresponding to one another among the image pickup regions, and it is thus possible to reduce noise present in the electrical signal provided from the pixel. Therefore, according to the solid-state image pickup device, it is possible to obtain an image where noise is reduced.

The image pickup section of the solid-state image pickup device has M (M is an integer of 2 or more) pixel arrays, the pixel includes: a photoelectric conversion section for generating a charge corresponding to received light; a floating diffusion section arranged adjacent to the photoelectric conversion section, where the charge is transferred to the floating diffusion section; a discharge section where the charge transferred to the floating diffusion section is discharged; and an output section for providing, via the transistor, the electrical signal corresponding to a potential of the floating diffusion section, where the output section is connected to the floating diffusion section, and a conversion gain in the image pickup section having a plurality of the pixel arrays is set to be M or more times the conversion gain in the image pickup section having one pixel array. According to such a configuration, it is possible to increase an output voltage value per each charge generated by the photoelectric conversion section. Therefore, it is possible to decrease a ratio of noise present in the electrical signal.

The transistor of the solid-state image pickup device is MOSFET, and a channel length of the MOSFET is shorter than a distance between the photoelectric conversion section and the floating diffusion section or shorter than a distance between the floating diffusion section and the discharge section. According to such a configuration, it is possible to increase a transconductance indicating a gain of a voltage and current, and thus, it is possible to widen a frequency band of the output section and achieve a noise reduction by limiting a band by a column amplifier provided at a later stage.

The image generating section of the solid-state image pickup device has a calculation section for calculating a variance of the electrical signal provided from the pixel; a selection section for selecting a combination of the image pickup regions so that a variance of the average value is minimized on the basis of the variance of each pixel; and an integration section for integrating the images by averaging, on the basis of the combination of the image pickup regions, the electrical signal for each pixel corresponding to one another among the image pickup regions. According to such a configuration, a pixel value of an integrated image is obtained by averaging the electrical signals provided from one or a plurality of pixels corresponding to one another, and thus, it is possible to reduce an overall noise level. Further, averaging the electrical signals is implemented by using a combination of image pickup regions where a variance of the average value is minimized, and thus, the electrical signal provided from the pixel having a relatively large noise is eliminated from the electrical signal used for integrating the signals. Therefore, it is possible to suitably reduce noise even when a pixel generating a relatively large noise such as a random telegraph system noise is included, for example.

The image generating section of the solid-state image pickup device has a coefficient calculation section for providing a weight coefficient applied to each electrical signal provided from the pixel; and an integration section for integrating the images by averaging values obtained by multiplying the weight coefficient by a value of the electrical signal provided from the pixel, for each pixel corresponding to one another among the image pickup regions. According to such a configuration, a pixel value of an integrated image is obtained by averaging the electrical signals provided from one or a plurality of pixels corresponding to one another, and thus, it is possible to reduce an overall noise level. Further, averaging the electrical signals uses a value of the electrical signal obtained by multiplying a weight coefficient, and thus, when a small weight coefficient is multiplied with the electrical signal provided from the pixel having a relatively large noise, it is possible to restrain an influence affecting the integrated image. Therefore, it is possible to suitably reduce noise even when a pixel generating a relatively large noise such as a random telegraph system noise is included, for example.

Advantageous Effects of Invention

The present invention provides a solid-state image pickup device capable of reducing noise.

BRIEF DESCRIPTION OF DRAWINGS

FIG. 9 is a diagram for describing a processing flow of the first embodiment.

FIG. 10 is a diagram for describing a processing flow of the first embodiment.

FIG. 16 is a diagram for describing an effect of the solid-state image pickup device according to the third embodiment.

FIG. 19 is a diagram for describing an example.

DESCRIPTION OF EMBODIMENTS

With reference to the attached drawings, a mode for carrying out the present invention will be described in detail, below. In the description of the drawings, the same reference sign is given to the same element, and duplicated descriptions are omitted.

First Embodiment

Figure 1:
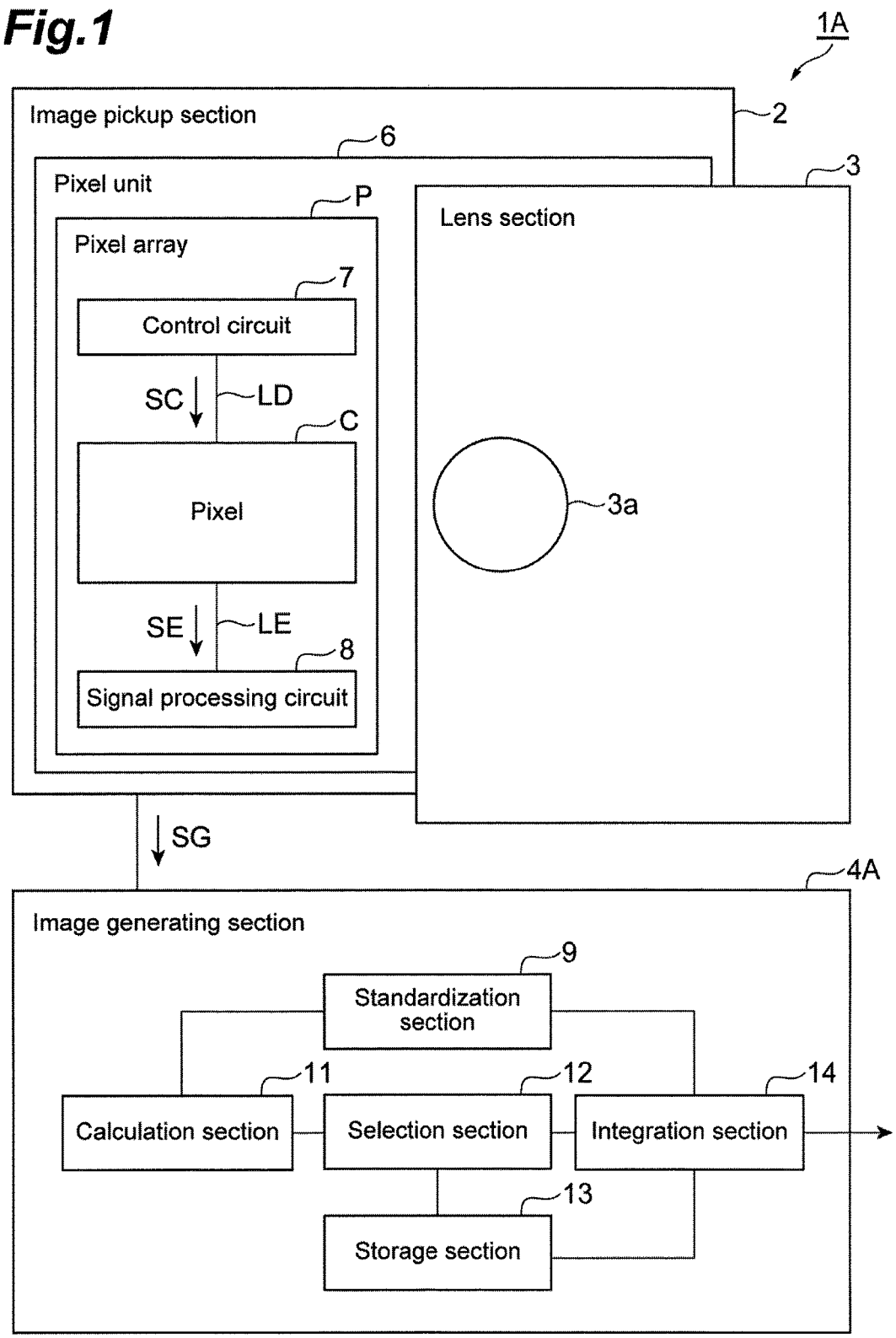
FIG. 1 is a diagram showing the configuration of a solid-state image pickup device according to a first embodiment.

FIG. 1 is a block diagram showing the configuration of a solid-state image pickup device 1A according to a first embodiment. As shown in FIG. 1, the solid-state image pickup device 1A includes an image pickup section 2 for providing, via a transistor, an electrical signal corresponding to received light, a lens section 3 having a plurality of lenses 3a, and an image generating section 4A for generating an image by using a signal output from the image pickup section 2.

Figure 2:
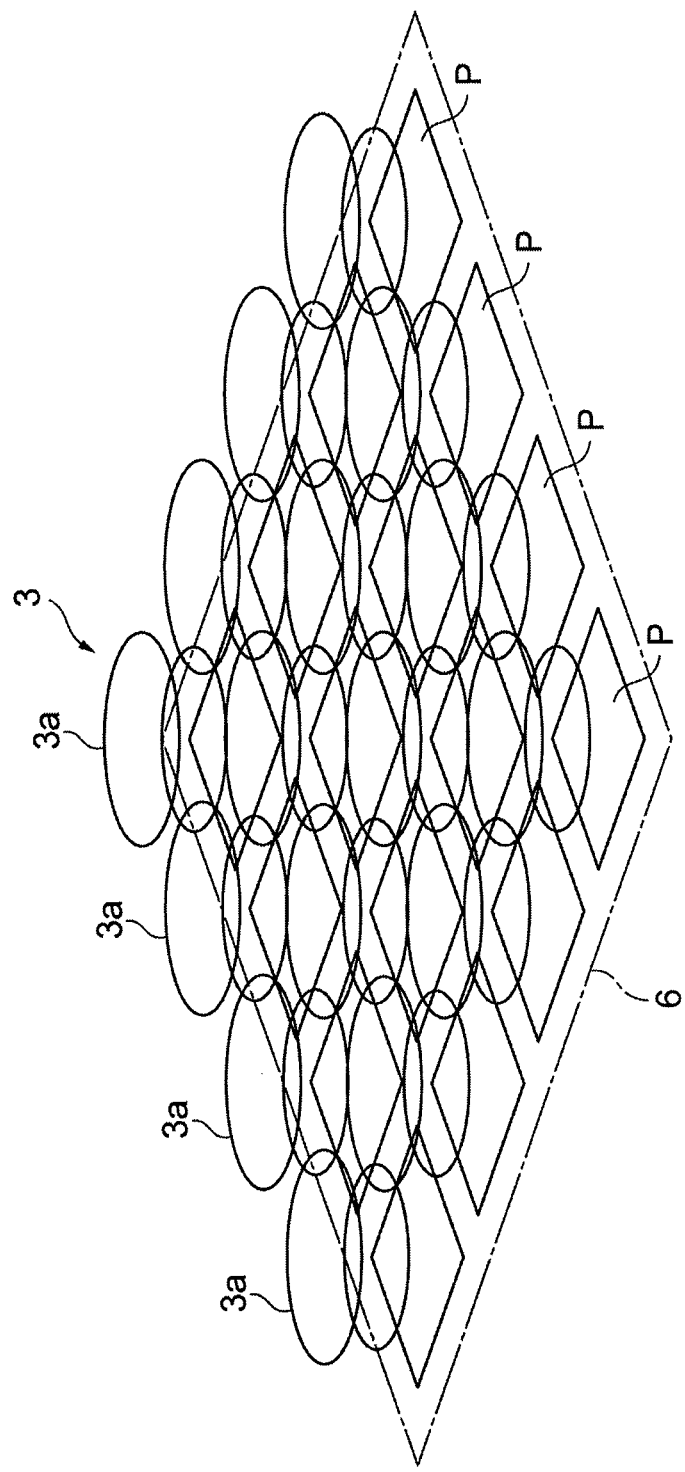
FIG. 2 is a diagram showing an arrangement of a pixel unit and a lens section.

The image pickup section 2 has a pixel unit 6 including a plurality of pixel arrays P for generating an electrical signal based on light from a subject, etc. FIG. 2 is a perspective view showing an arrangement of the pixel unit 6 and the lens section 3. The pixel unit 6 has a plurality of the pixel arrays P arranged in a square lattice manner. The lens section 3 includes a plurality of lenses 3a arranged in a square lattice manner. The plurality of lenses 3a are arranged at a position respectively corresponding to a plurality of the pixel arrays P, and form a subject image onto each pixel array P. According to such an arrangement of the pixel arrays P and lenses 3a, one image pickup region T onto which a subject image is formed is set to each of the pixel arrays P (see FIG. 4). That is, each pixel array P according to the present embodiment has one image pickup region T. The image pickup section 2 according to the present embodiment has a plurality of the pixel arrays P. Therefore, a plurality of pieces of image data in which a subject is imaged are provided from the image pickup section 2. It is noted that a configuration having a plurality of the pixel arrays P and the lens section 3 is called a multi-aperture structure. Further, the plurality of pieces of image data obtained from the image pickup section 2 having a plurality of the pixel arrays P are called a multi-aperture image.

It is noted that FIG. 2 shows the pixel unit 6 in which 16 pixel arrays P are arranged; however, the number of the pixel arrays P present in the pixel unit 6 is not limited to 16. The number of the pixel arrays P present in the pixel unit 6 may be equal to or less than 16 and may be equal to or more than 16. Further, FIG. 2 shows the lens section 3 in which 16 lenses 3a are arranged; however, the number of the lenses 3a present in the lens section 3 is not limited to 16. The number of the lenses 3a present in the lens section 3 may be equal to or less than 16 and may be equal to or more than 16.

As shown in FIG. 1, the pixel array P is configured as one chip. In the chip, a plurality of pixels C, a control circuit 7 for controlling an operation of each pixel C, and a signal processing circuit 8 for processing an electrical signal SE output from each pixel C are arranged. According to each pixel array P having such a configuration, in each pixel array P that is one image sensor, noise is reduced because signal processing such as A/D conversion processing and amplification processing is performed. The control circuit 7 generates a control signal SC for controlling each pixel C. For example, the control circuit 7 generates the control signal SC for selecting a row from which the electrical signal SE is output, and outputs the signal to a driving line LD. The driving line LD includes a plurality of transfer switch driving lines, reset switch driving lines, and row selecting switch driving lines, etc. The control circuit 7 is divided in a plurality of blocks and arranged around each pixel C.

The signal processing circuit 8 includes a readout circuit for reading out the electrical signal SE from each pixel C for each row, a sample-and-hold circuit and/or a noise canceling circuit, and an A/D conversion circuit, etc. The sample-and-hold circuit holds a signal corresponding to a reset level and a signal corresponding to a signal level. The noise canceling circuit generates a difference between the reset level and the signal level, and cancels reset noise of a pixel. The signal processing circuit 8 generates an image signal SG obtained when predetermined signal processing is performed on the electrical signal SE, and outputs the resultant signal to an image generating section 4A.

It is noted that the image pickup section 2 according to the present embodiment is not limited to the above-described configuration, and, for example, configuration thereof may be such that the control circuit 7 and the signal processing circuit 8 are arranged outside the pixel arrays P. For example, the image pickup section 2 may be configured to have the pixel unit 6 that is one chip having a plurality of the pixel arrays P, the control circuit 7 for controlling all the pixel arrays P included in the pixel unit 6, and the signal processing circuit 8 for processing the electrical signal SE output from all the pixel arrays P included in the pixel unit 6. According to such a configuration, each pixel C is controlled and the electrical signal SE is processed not for each pixel array P but among a plurality the of pixel arrays P.

The image generating section 4A generates an image by using the image signal SG output from the signal processing circuit 8 of the image pickup section 2. The image generating section 4A has a standardization section 9 that is a functional constituent element, a calculation section 11, a selection section 12, a storage section 13, and an integration section 14. The standardization section 9 performs predetermined standardization processing on the image signal SG output from the image pickup section 2. The standardization processing includes a correction of a distortion, a correction of an image forming magnification, a segmentation for making an image size consistent, alignment, etc. The calculation section 11 calculates a variance of noise present in the pixel of the pixel arrays P, and outputs the result to the selection section 12. The selection section 12 selects, on the basis of the variance of each pixel output from the calculation section 11, a combination of the image pickup regions T so that a variance of the average value is minimized. Information on the combination of the image pickup regions T for each corresponding pixel is output to the storage section 13 to be stored therein. The storage section 13 stores information used for integrating the image signals SG output from the image pickup section 2. The integration section 14 integrates, on the basis of the information stored in the storage section 13, the image signals SG output from the image pickup section 2, into one piece of image data.

Figure 3:
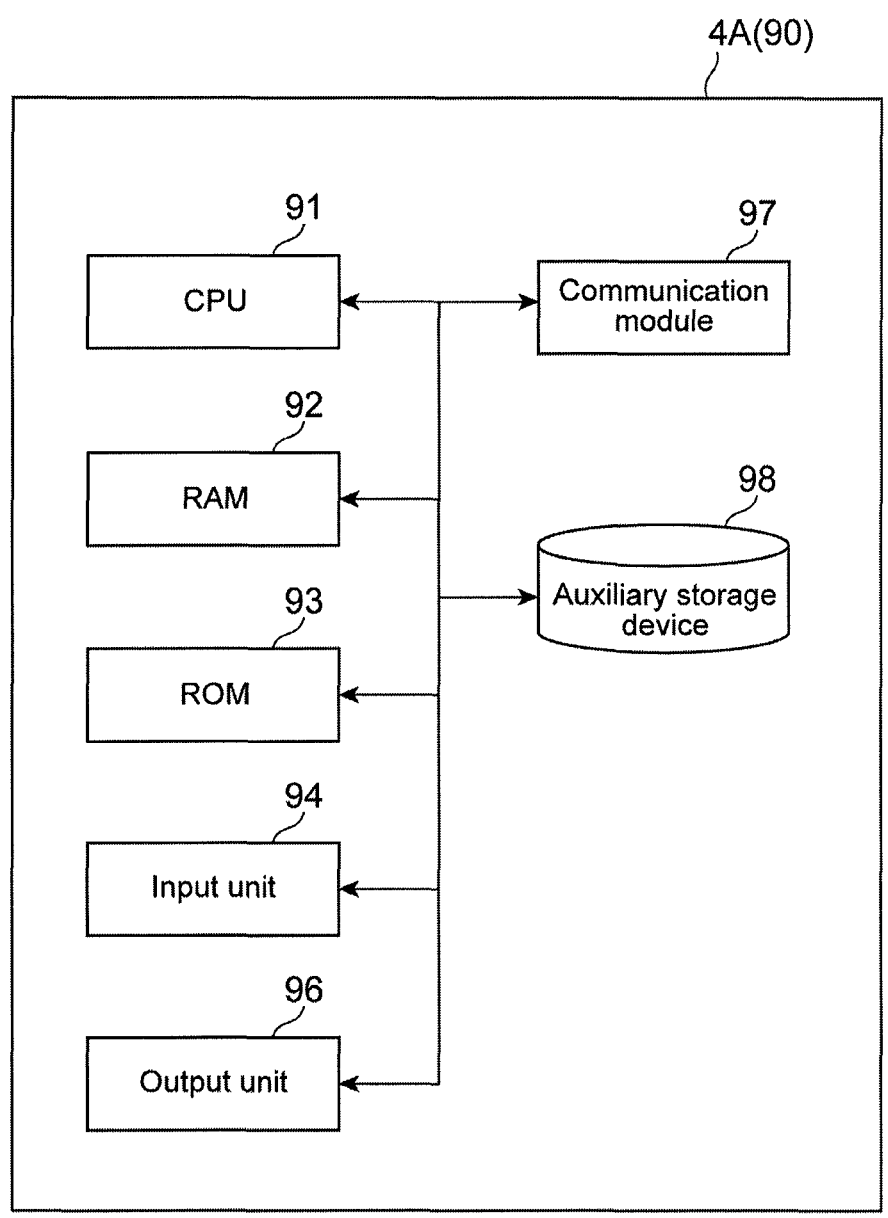
FIG. 3 is a diagram showing one example of hardware configuring an image generating section.

The image generating section 4A is realized by using a computer 90 shown in FIG. 3, for example. The computer 90 is an example of hardware configuring the image generating section 4A. The computer 90 includes various types of data processing devices, such as a server device and a personal computer, which are provided with a CPU and which are for performing processing or control by software. The computer 90 is configured as a computer system including a CPU 91, a RAM 92 and a ROM 93, which are main memory devices, an input unit 94 or input device such as a keyboard and a mouse, an output unit 96 such as a display and a printer, a communication module 97 or data transmission/reception device such as a network card, and an auxiliary storage device 98 such as a hard disk, etc. The functional constituent elements shown in FIG. 1 are realized when predetermined computer software is read on hardware such as the CPU 91 and the RAM 92, under control of the CPU 91, to thereby operate the input unit 94, the output unit 96, and the communication module 97 and to read and write data from and into the RAM 92 and the auxiliary storage device 98.

Figure 4:
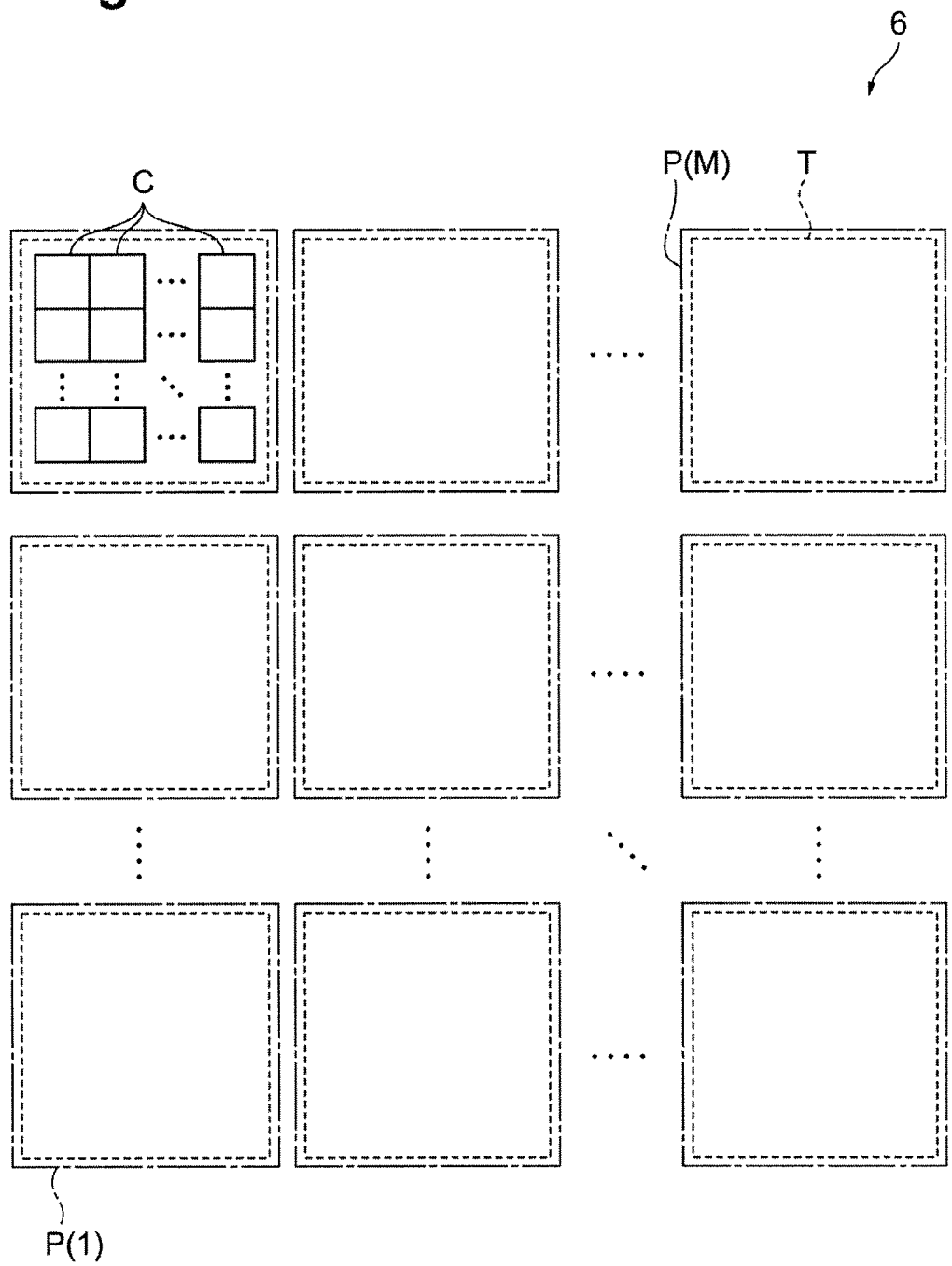
FIG. 4 is a diagram for describing the configuration of the pixel unit.

FIG. 4 is a diagram for describing the configuration of the pixel unit 6. The pixel unit 6 has M pixel arrays P. A plurality of the pixel arrays P are two-dimensionally arranged in a square lattice manner. Each of the pixel arrays P has a plurality of pixels C. Each pixel C provides, via a transistor, the electrical signal SE corresponding to received light. The plurality of pixels C are two-dimensionally arranged in a square lattice manner.

Figure 5:
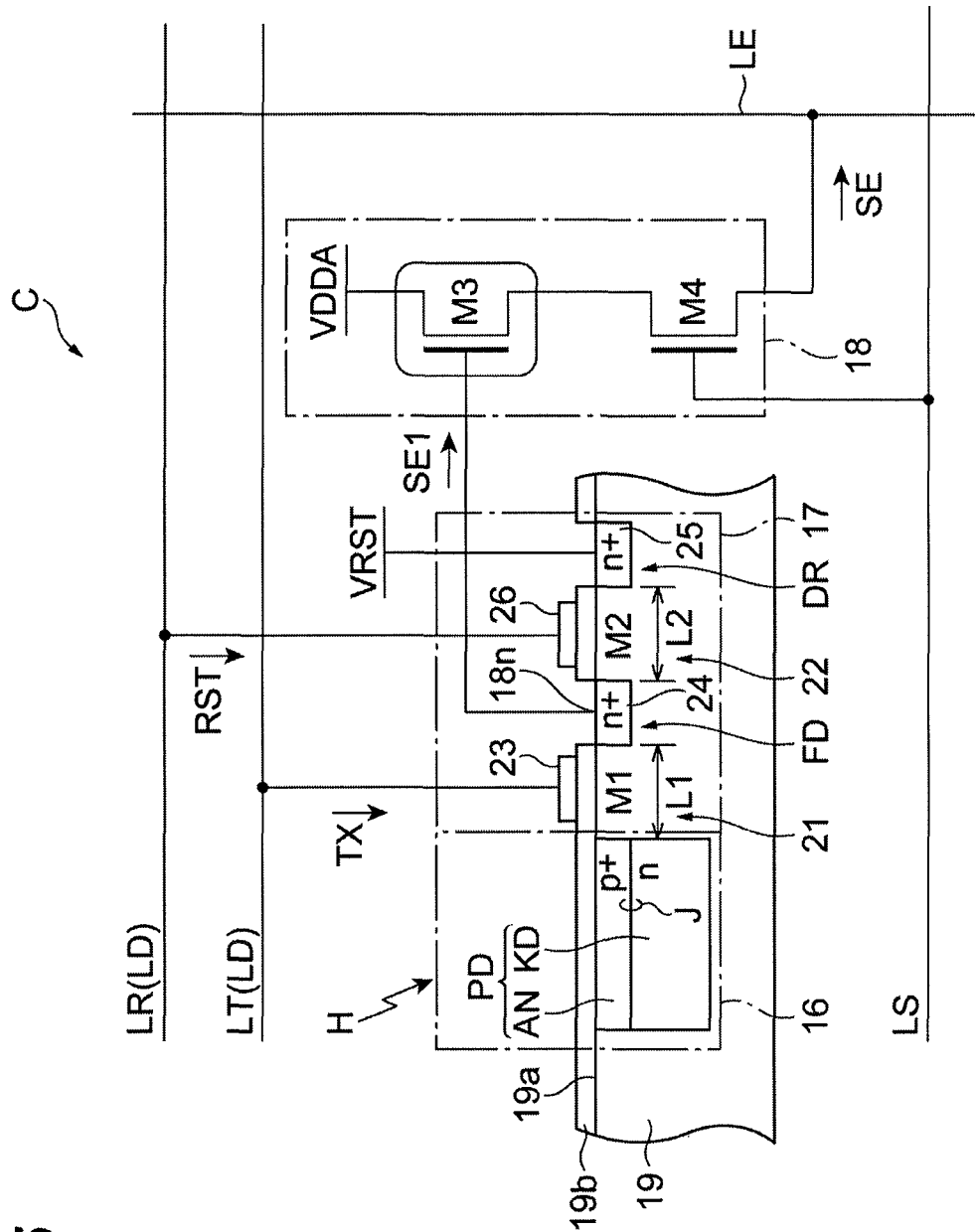
FIG. 5 is a diagram showing one example of a structure of a pixel contained in the solid-state image pickup device according to the first embodiment.

Each pixel C will be described. FIG. 5 is a diagram showing one example of a structure of the pixel C contained in the solid-state image pickup device 1A. Each pixel C has a photoelectric conversion section 16, a signal readout section 17, and an output section 18. The structure of each pixel C is a 4-transistor active pixel sensor (APS) in which a pin photodiode used in a CMOS image sensor is used. Further, in the pixel C, for a reduction in noise, an electrostatic capacity in the floating diffusion section is reduced in size and a charge-voltage conversion gain in the floating diffusion section is increased. For a reduction in noise, a frequency band in the output section 18 is broadened, and a band is restricted by a column amplifier arranged at a later stage. To realize such a configuration, a low-voltage MOSFET is used for a transistor configuring a source follower circuit in the output section 18 for reading out a voltage in the floating diffusion section.

The photoelectric conversion section 16 generates a charge corresponding to received light. The photoelectric conversion section 16 includes a buried photodiode PD. The photodiode PD is buried in a principal surface 19a of a semiconductor substrate 19. The photodiode PD includes a relatively shallow p+-type semiconductor region AN arranged on the principal surface 19a of the semiconductor substrate 19, and a relatively deep n-type semiconductor region KD arranged immediately below the p+-type semiconductor region AN. The p+-type semiconductor region AN and the n-type semiconductor region KD form a p-n junction J. The p-n junction J is buried into the semiconductor substrate 19, and thus, a dark current of the photodiode PD is very small. The p+-type semiconductor region AN is grounded via the semiconductor substrate 19. The n-type semiconductor region KD is shared with a source of a transistor M1 and the photodiode PD is thereby connected to the transistor M1.

The signal readout section 17 is juxtaposed adjacently to the photoelectric conversion section 16. The signal readout section 17 outputs the electrical signal SE, via the output section 18, to a signal line LE. The electrical signal SE corresponds to the charge transferred from the photoelectric conversion section 16 to a floating diffusion region of the signal readout section 17. The signal readout section 17 includes a first barrier section 21, a floating diffusion section FD, a second barrier section 22, and a discharge section DR.

The first barrier section 21 is juxtaposed adjacently to the photodiode PD. The first barrier section 21 is formed by a p-type semiconductor, and forms a predetermined potential barrier. The surface of the first barrier section 21 is connected with a gate electrode 23 via an insulating layer 19b. The floating diffusion section FD is juxtaposed adjacently to the first barrier section 21. The floating diffusion section FD is formed by an n+ semiconductor 24, and the surface thereof is connected with an input terminal 18n of the output section 18. According to such a configuration, the transistor M1 is formed in which the n-type semiconductor region KD of the photodiode PD is a source, the floating diffusion section FD is a drain, and the gate electrode 23 is a gate. When the transistor M1 is used, the magnitude of the potential bather of the first barrier section 21 is controlled by a transfer signal TX applied from the gate electrode 23 to the first barrier section 21. Thus, the charge generated in the photodiode PD is transferred to the floating diffusion section FD.

The second barrier section 22 is juxtaposed adjacently to the floating diffusion section FD. The second barrier section 22 is formed by a p-type semiconductor, and forms a predetermined potential barrier. The surface of the second barrier section 22 is connected with a gate electrode 26 via the insulating layer 19b. The discharge section DR is juxtaposed adjacently to the second barrier section 22. The discharge section DR is formed by an n+ semiconductor 25, and the surface thereof is connected with a high-potential power source VRST. According to such a configuration, a transistor M2 is formed in which the floating diffusion section FD is a source, the discharge section DR is a drain, and the gate electrode 26 is a gate. Further, when the gate electrode 26 is connected to a driving line LR, the transistor M2 operates as a reset switch for resetting the charge transferred to the signal readout section 17. That is, the magnitude of the potential barrier of the second barrier section 22 is controlled by a reset signal RST applied, via the gate electrode 26, to the second barrier section 22. Thus, the charge transferred to the floating diffusion section FD is discharged to the discharge section DR, and thus, the charge of the floating diffusion section FD is reset.

The output section 18 provides the electrical signal SE corresponding to the potential based on the charge transferred to the floating diffusion section FD. The output section 18 includes transistors M3 and M4, and forms a circuit configuration of a so-called source follower amplifier. The transistors M3 and M4 function as a readout amplifier. A gate of the transistor M3 is connected to the floating diffusion section FD, a drain thereof is connected to a high-potential power source VDDA, and a source thereof is connected to a drain of the transistor M4. The transistor M4 functions as a selecting switch. A gate of the transistor M4 is connected to a driving line LS, a drain thereof is connected to the source of the transistor M3, and a source thereof is connected to the signal line LE.

Incidentally, even when a micro CMOS process is used when the solid-state image pickup device 1A is manufactured, MOSFET having a withstand voltage of 3.3 V is sometimes used for the transistors M1 and M2 that are analog parts of the pixel C in order that a signal amplitude is ensured. In the transistors M1 and M2, a film thickness of the insulating layer 19b in the gate electrodes 23 and 26 is set to be large and channel lengths L1 and L2 are set to be long. Here, the channel length L1 is a distance between the photodiode PD and the n+ semiconductor 24 configuring the floating diffusion section FD. Further, the channel length L2 is a distance between the n+ semiconductor 24 configuring the floating diffusion section FD and the n+ semiconductor 25 configuring the discharge section DR. In this case, the shortest channel lengths of the transistors M1 and M2 are about 0.4 µm, for example.

Here, when the transistors M3 and M4 of the output section 18 are MOSFET having a withstand voltage of 3.3 V as in the transistors M1 and M2, it is not possible to increase a transconductance (hereinafter, may also be referred to as "gm") indicating a gain of a voltage and current, and thus, it becomes difficult to reduce noise.

Therefore, a low-voltage micro MOSFET to which a manufacturing process rule smaller than that of the transistors M1 and M2 is applied is used for the transistors M3 and M4 according to the present embodiment. MOSFET having a withstand voltage of 1.8 V in which the shortest channel length is 0.18 µm is used for the transistors M3 and M4, for example. That is, a 0.18-µm process is used when the transistors M3 and M4 are manufactured. In this case, the shortest channel lengths of the transistors M3 and M4 are about the half that of the transistors M1 and M2. When the transistors M3 and M4 are manufactured, in consideration of a manufacture variance, the channel length is set to a length increased by about 10% to several 10% relative to the shortest channel length. According to the output section 18 having the transistors M3 and M4 in which such a micro MOSFET is used, it is possible to broaden the frequency band of an image source follower and reduce noise by limiting a band by a column amplifier arranged at a later stage.

The conversion gain in the present embodiment is based on various factors such as an electrostatic capacity of the floating diffusion section FD, a parasitic capacity of the transistors M1 to M4, and a reduction effect due to a voltage gain in the transistors M3 and M4 or source follower amplifiers. The conversion gain provided in each pixel C according to the present embodiment may be set to M or more times the conversion gain in the image pickup section having one pixel array P when the number of the pixel arrays P provided in the image pickup section 2 is M (M is an integer of 2 or more), for example. For example, the conversion gain is set to an order of 100 μV/e⁻ to 1 mV/e⁻ (100 microvolts per one charge to 1 millivolt per one charge).

Here, the electrostatic capacity of the floating diffusion section FD that forms part of the conversion gain will be described. The floating diffusion section FD converts a charge amount into an electrical signal SE1, on the basis of a charge amount transferred from the photodiode PD and the electrostatic capacity in the floating diffusion section FD, and outputs the resultant amount. A relationship among a charge amount Q, an effective electrostatic capacity $C_{FD}$ of the floating diffusion section FD, and a voltage $\Delta V$ of the electrical signal SE1 is indicated by the following formula (1). According to the following formula (1), the voltage $\Delta V$ is in proportion to the charge amount Q and is in inverse proportion to the effective electrostatic capacity $C_{FD}$. Therefore, in order to enhance the charge-voltage gain of the floating diffusion section FD, the effective electrostatic capacity $C_{FD}$ of the floating diffusion section FD may be decreased, for example. It is noted that the charge-voltage gain in the floating diffusion section FD forms part of the conversion gain in the present embodiment.

[Formula 1]

$$\Delta V = Q/C_{FD} \ldots \quad (1)$$

The effective electrostatic capacity $C_{FD}$ of the floating diffusion section FD is set on the basis of the number of saturation electrons (q·N) and a maximum amplitude (Vpp) of the electrical signal SE, as indicated by the following formula (2). The effective electrostatic capacity $C_{FD}$ of the floating diffusion section FD depends on an impurity profile, a concentration, and a manufacturing process of the semiconductor substrate 19 and the n+ semiconductor 24. The floating diffusion section FD according to the present embodiment has an effective electrostatic capacity $C_{FD}$ of 0.1 fF to 1 fF order, for example. When the effective electrostatic capacity $C_{FD}$ of the floating diffusion section FD is set as this, it is possible to enhance the output voltage value per each charge.

[Formula 2]

$$Q = q \cdot N = C_{FD} \cdot Vpp \ldots \quad (2)$$

$$Q = q \cdot N = C_{FD} \cdot Vpp \ldots \quad (2)$$

An operation of each pixel C in the solid-state image pickup device 1A thus described will be described. First, when light H is incident on each pixel C, a charge in the photodiode PD is generated. When the charge is generated, the transfer signal TX having a predetermined positive voltage is applied from the control circuit 7, via a transfer switch driving line LT, to the gate electrode 23. At this time, the height of the potential barrier of the first barrier section 21 is lowered, and thus, the charge is transferred from a potential well of the photodiode PD to a potential well of the floating diffusion section FD. It is noted that the depth of the potential well of the floating diffusion section FD is made greater than the depth of the potential well of the photodiode PD, and thus, it is possible to realize a complete potential transfer.

When the charge is transferred to the floating diffusion section FD, the potential of the floating diffusion section FD changes corresponding to the effective electrostatic capacity $C_{FD}$ of the floating diffusion section FD and the charge amount transferred to the floating diffusion section FD. Then, the control signal SC is applied from the control circuit 7, via the row selecting switch driving line LS, to the gate of the transistor M4. Thus, the potential of the floating diffusion section FD via the transistors M3 and M4 of the output section 18 is output, as the electrical signal SE, to the signal line LE via the output section 18.

Figure 6:
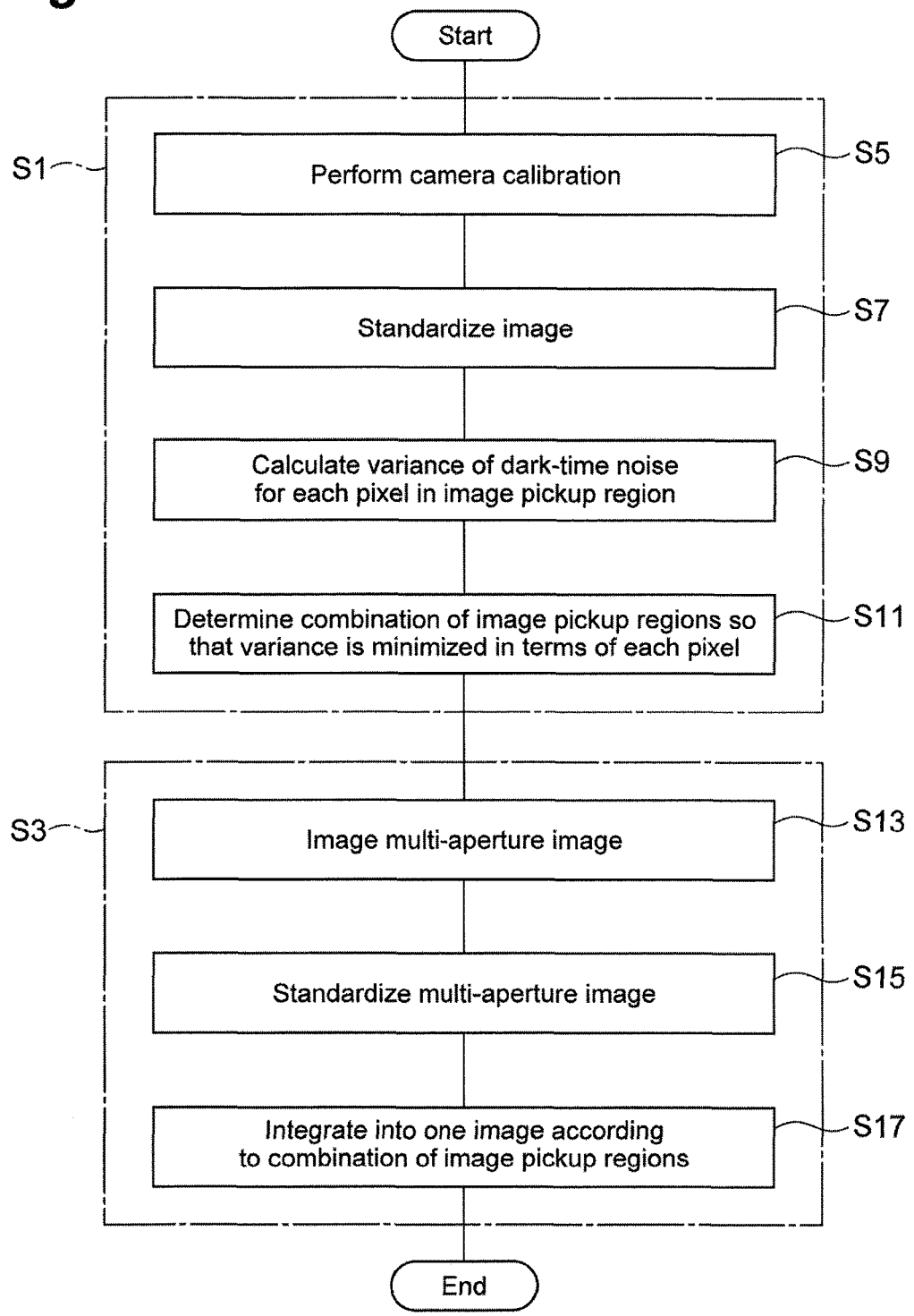
FIG. 6 is a flowchart for describing a processing flow of the first embodiment.

Next, a processing flow of photographing by the solid-state image pickup device 1A according to the present embodiment will be described. FIG. 6 is a flowchart for describing a processing flow of the first embodiment. The processing flow includes a pre-treatment step (step S1) implemented before photographing a multi-aperture image and a post-treatment step (step S3) implemented at the time of photographing the multi-aperture image.

Figure 7:
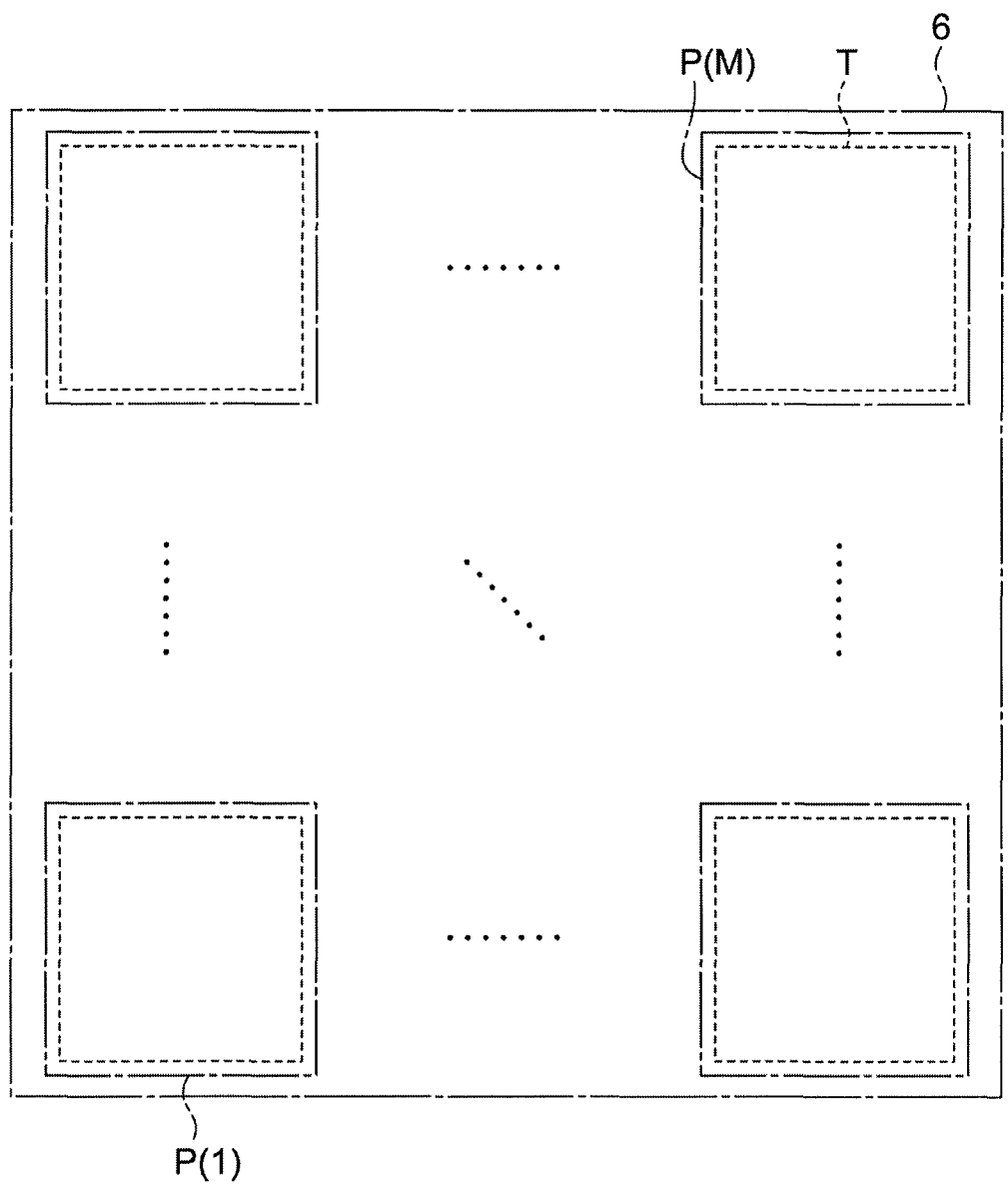
FIG. 7 is a diagram showing one example of the pixel unit.

FIG. 7 is a diagram showing one example of the pixel unit 6 used for describing the processing flow. The pixel unit 6 has M (M is an integer of 2 or more) pixel arrays P. In the pixel unit 6, a pixel array P at the bottom left corner is P(1), and a pixel array P at the top right corner is P(M). It is noted that the referencing of the pixel arrays P is for the sake of convenience of explanation, and thus, another rule may apply to the referencing.

Figure 8:
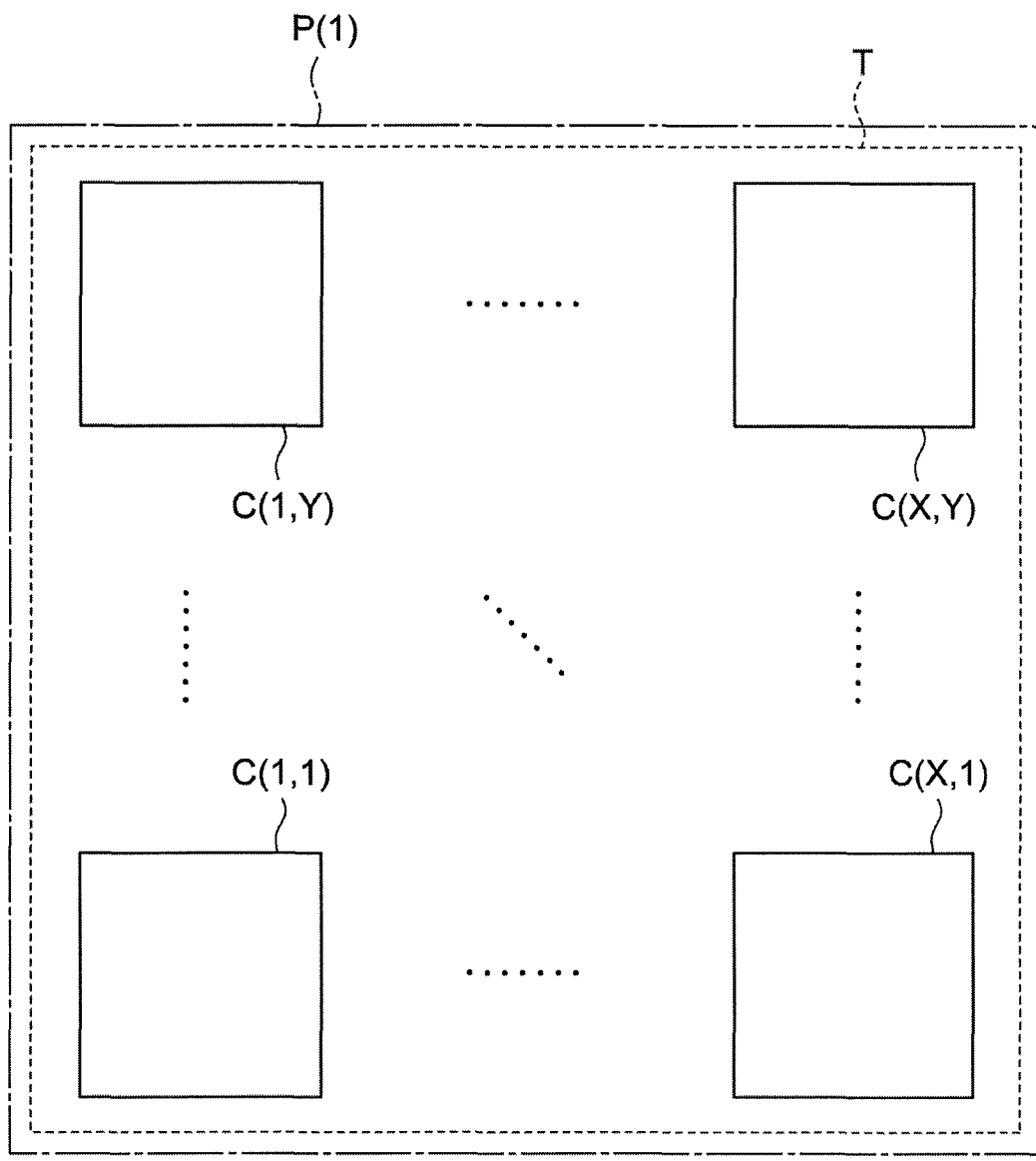
FIG. 8 is a diagram showing one example of the pixel array.

FIG. 8 is a diagram showing one example of the pixel array P used for describing the processing flow. The pixel array P(1) has XxY pixels C. In the pixel array P(1), a pixel C at the bottom left corner is C(1, 1), a pixel C at the bottom right corner is C(X, 1), a pixel C at the top left corner is C(1, Y), and a pixel C at the top right corner is C(X, Y). It is noted that the referencing of the pixel C is for the sake of convenience of explanation, and thus, another rule may apply to the referencing.

At the pre-treatment step S1, information necessary for integrating a plurality of images acquired in a plurality of the pixel arrays P into one image is acquired. The necessary information is a combination of the image pickup regions T for each pixel C unit. That is, the image pickup region T used for integrating the images is selected for each pixel C. In the present embodiment, each pixel array P has one image pickup region T, and thus, the necessary information is information on a combination of the pixel arrays P which allows noise present in each pixel C to be minimized. As an example of the information on the combination, in the pixel C(1, 1), the pixel arrays P, that is, the pixel array P(1), P(3), . . . P(m), are selected. Further, in another pixel C(x, y), a combination of other pixel arrays P, that is, a pixel array P(2), P(6), . . . P(m), is selected. It is noted that the information on the combination is for the sake of convenience of explanation, and when the combination of the pixel arrays P selected for integrating the pixel values of the pixel C(1, 1) and another pixel C(x, y) is selected, other pixel arrays P other than the above may be selected. First, a camera calibration for removing a distortion in a multi-aperture image imaged by the image pickup section 2 is implemented (step S5). At this step S5, the lens 3a configuring the lens section 3 is assumed to be a pinhole lens, and a focal length, an intersection point between an optical axis of the lens 3a and the pixel array P, a distortion parameter, etc., are estimated. Further, this step S5 is generally implemented by using various test patterns such as a white checkerboard and a polka dot.

Next, the solid-state image pickup device 1A is disposed in a camera obscura, etc., to achieve a state where light is not incident on the pixel C. Then, a predetermined number of dark-time images G (m, r) is acquired in this state (see FIG. 9(a)). Here, m denotes a symbol indicating a location of each pixel array P in the pixel unit 6, and r denotes the acquisition number of the dark-time images G. For example, the acquisition number r of the dark-time images G is 5 or more, and preferably is 100 or more.

Next, the dark-time image G acquired in each pixel array P is standardized (step S7) on the basis of a parameter estimated in the calibration (step S5). This step S7 is mainly executed by the standardization section 9 of the image generating section 4A. At step S7, the distortion in each dark-time image G is corrected. Further, at step S7, a difference in image forming magnification due to a difference in the focal length provided in each lens 3a is corrected. In this correction, the pixel array P that serves as a reference in a plurality of the pixel arrays P is set in advance. Further, at step S7, the dark-time image G is segmented into dark-time images each having an equal size, where an intersection point between the optical axis of the lens 3a and the pixel array P is set as the center of the dark-time image G. As a result of this step S7, a standardized dark-time image GD is obtained. In the standardized dark-time image GD, a corresponding pixel of the image of each pixel array P is placed on identical coordinates.

Next, the variance of dark-time noise for each pixel C of the dark-time image GD is calculated (step S9). This step S9 is mainly executed in the calculation section 11 of the image generating section 4A. The dark-time noise includes shot noise by a dark current of the photodiode PD, readout noise in the signal readout section 17 and the output section 18, etc. A variance $\sigma^2$ of the dark-time noise shows a variance of the electrical signals SE output from each pixel C.

FIG. 9(c) is an example of a graph showing the dark-time noise. A part (i) of FIG. 9(c) is a graph of a dark-time image GD(1) imaged in the pixel array P(1), where a vertical axis represents a pixel value present in the pixel C(1, Y) (see FIG. 9(b)) and a horizontal axis represents the number of dark-time images GD. The pixel C has a variance of $\sigma^2(1)$. A part (ii) of FIG. 9(c) is a graph of a dark-time image GD(2) imaged in the pixel array P(2), where a vertical axis represents a pixel value present in the pixel C(1, Y) corresponding to the pixel array P(2) (see FIG. 9(b)) and a horizontal axis represents the number of dark-time images GD. The pixel C has a variance of $\sigma^2(2)$. A part (iii) of FIG. 9(c) is a graph of a dark-time image GD(M) imaged in the pixel array P(M), where a vertical axis represents a pixel value present in the pixel C(1, Y) corresponding to the pixel array P(M) (see FIG. 9(b)) and a horizontal axis represents the number of dark-time images GD. The pixel C has a variance of $\sigma^2(M)$. When (i) to (iii) of FIG. 9(c) are confirmed, it is known that the electrical signal SE having different dark-time noise is output from the pixel C corresponding to one another among the pixel arrays P. At step S9, the above-described steps are repeated to calculate the variance $\sigma^2$ of each dark-time noise in the pixels C(1, 1) to C(X, Y).

It is noted that when step S7 of standardizing the dark-time image G and step S9 of calculating the variance $\sigma^2$ of the dark-time noise are carried out, step S9 may be implemented before step S7.

Next, the combination of the pixel arrays P is determined so that the magnitude of the dark-time noise is minimized in terms of each pixel C (step S11). This step S11 is mainly executed in the selection section 12 of the image generating section 4A. Step S11 will be described, below, with an example of a step for determining a combination of the pixel arrays P for generating a pixel value in the pixel C(1, Y).

As shown in FIG. 10(a), as a result of step S9, the variances $\sigma^2(1)$ to $\sigma^2(M)$ of the pixel C(1, Y) corresponding to one another among the pixel arrays P are calculated. The variance $\sigma^2$ of the pixel C in the pixel array P(1) is $\sigma^2(1)$. The variance $\sigma^2$ of the pixel C in the pixel array P(2) is $\sigma^2(2)$. The variance $\sigma^2$ of the pixel C in the pixel array P(3) is $\sigma^2(3)$. The variance $\sigma^2$ of the pixel C in the pixel array P(m) is $\sigma^2(m)$. The variance $\sigma^2$ of the pixel C in the pixel array P(M) is $\sigma^2(M)$.

Next, as shown in FIG. 10(b), the variances $\sigma^2$ are rearranged in the ascending order. In the present embodiment, the variance $\sigma^2$ becomes larger in the order of $\sigma^2(3)$, $\sigma^2(2)$, $\sigma^2(1)$, and $\sigma^2(M)$, where $\sigma^2(m)$ is the smallest of all.

Figure 11:
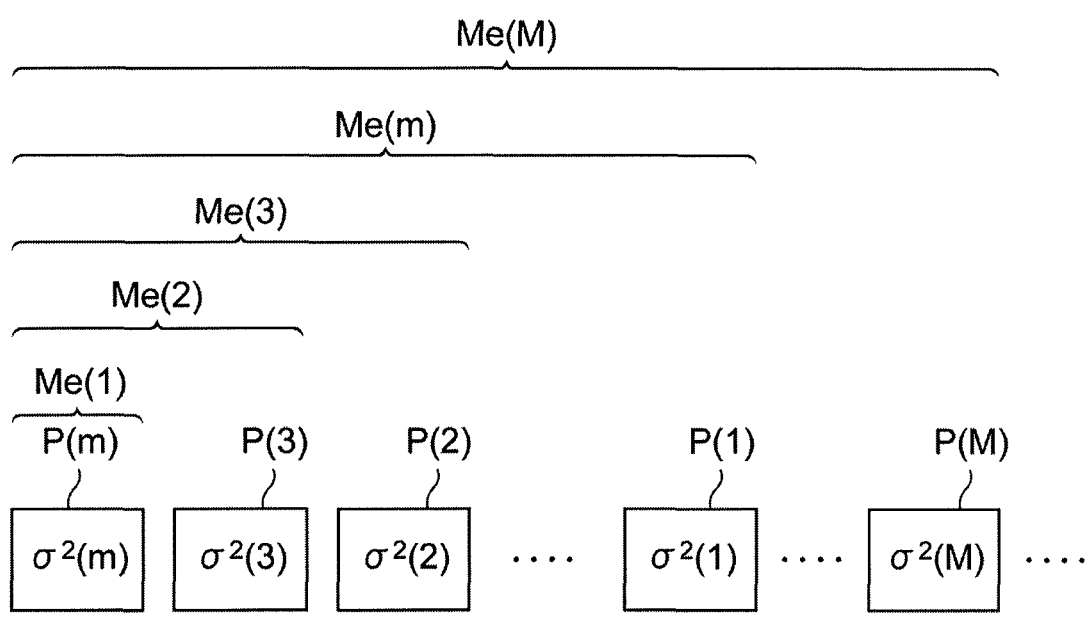
FIG. 11 is a diagram for describing a processing flow of the first embodiment.

Next, as shown in FIG. 11, a variance value Me obtained when the pixel values are averaged in the ascending order in the value of the variance $\sigma^2$ is calculated according to the following formula (3). Here, in the following formula (3), $A=\{1, 2, \ldots, M\}$, indicating a set of pixel arrays P. Further, in the following formula (3), $A' \subseteq A$, and N' indicates the number of elements of A'. Further, the dark-time noise in the present embodiment follows a Gaussian distribution.

[Formula 3]

$$Me(m) = \tilde{A}' = \operatorname*{argmin}_{A'} \sum_{i \in A'} \frac{\sigma_i^2}{N'^2} \qquad (3)$$

First, by using the above formula (3), $\sigma^2(m)$ where the variance $\sigma^2$ is the smallest and $\sigma^2(3)$ where the variance $\sigma^2$ is the second smallest, the variance value Me (2) is calculated. Next, by using the above formula (3), $\sigma^2(m)$, $\sigma^2(3)$ and $\sigma^2(2)$, the variance value Me (3) is calculated. Thus, in much the same way as in the above, the number of the variance $\sigma^2$ used for calculating the variance value Me is incremented one by one so that the variance values Me are respectively calculated, whereby, the variance values Me(1) to Me(M) of average values of the pixel values are obtained. It is noted that the variance value Me(1) of the pixel average value is $\sigma^2(m)$ where the value of the variance is the smallest. A combination of the pixel arrays P where the value is the smallest in the variance values Me(1) to Me(M) is the combination of the pixel arrays P for generating the pixel value in the pixel C(1, Y). The selected pixel C is flagged by a predetermined method.

At the post-treatment step S3, the multi-aperture image imaged by the image pickup section 2 is combined into one image, on the basis of the information acquired at the pre-treatment step S1.

First, the solid-state image pickup device 1A is used and the multi-aperture image is thereby imaged (step S13). Next, the image in each pixel array P is subject to standardization processing (step S15). At step S15, as in the processing at step S7, various types of processing are performed which include a correction of a distortion, a correction of an image forming magnification, a segmentation for making an image size consistent, alignment, etc. Then, on the basis of the image data in each standardized pixel array P and the information on the combination of the pixel arrays P stored in the storage section 13, the multi-aperture images are integrated into one image. This step S17 is executed in the integration section 14 of the image generating section 4A. The combined pixel value is calculated according to the following formula (4), where $P_i$ denotes the pixel value of each pixel array P. Through the above steps, the image in which noise is reduced is obtained. It is noted that where necessary, noise reduction filter processing such as a bilateral filtering may be implemented on the integrated image to obtain a final output image.

[Formula 4]

$$P' = \sum_{i \in A'} \frac{P_i}{N'} \quad (4)$$

An effect of the solid-state image pickup device 1A will be described. The solid-state image pickup device 1A has a multi-aperture structure including a plurality of lenses 3a, and thus, it is possible to obtain a multi-aperture image formed of image data obtained by imaging a subject image. In the image generating section 4A, the electrical signals SE are averaged for each pixel C corresponding to one another among the image pickup regions T, and it is possible to reduce noise present in the electrical signal SE provided from the pixel C. Therefore, according to the solid-state image pickup device 1A, it is possible to obtain an image where noise is reduced.

Incidentally, the pixel of the CMOS image sensor is greatly influenced by noise generated from a reading transistor of a pixel. In particular, random telegraph signal noise (RTS noise) is observed. The RTS noise results from a fact that a flat band voltage shifts when an electron is captured in an interface level. In the pixel where the RTS noise is generated, output is varied randomly. In particular, in the microfabricated MOSFET, the RTS noise may increase. In the microfabricated MOSFET, a threshold value increases temporarily and locally due to a variance in impurity distribution, and a characteristic in a minute region dominates a whole characteristic. In the solid-state image pickup device 1A according to the present embodiment, the microfabricated MOSFET is used in the output section 18, and thus, it is possible to reduce noise by limiting a band. On the other hand, in the pixel C of the solid-state image pickup device 1A, the microfabricated MOSFET is used, and thus, it is highly likely that the RTS noise is generated. However, even when the pixel C where the RTS noise is generated is included, the electrical signal SE provided from the pixel C where a relatively large noise such as the RTS noise is generated is not used for integrating the images in the process of the averaging. Therefore, it is possible to restrain the influence of the RTS noise when the microfabricated MOSFET is applied and possible to reduce input referred noise.

The solid-state image pickup device 1A according to the present embodiment has a multi-aperture structure. According to such a configuration, it is possible to increase a combined effective pixel size. Therefore, even in a single exposure time period, it is possible to achieve both a large number of saturation electrons and super high-sensitivity.

The solid-state image pickup device 1A according to the present embodiment has a plurality of the pixel arrays P. According to such a configuration, when a defective pixel is included in some pixel arrays P, the images are integrated on the basis of the electrical signal SE of another pixel array P without using the electrical signal SE of the pixel array P including the defective pixel. Therefore, a complement by the defective pixel is not needed, and thus, it is possible to detect a minute object from which very weak light of one pixel size is emitted.

Incidentally, there is a method of improving the sensitivity of a camera system by enlarging the aperture of a lens, that is, decreasing an F value of a lens, to capture as much light as possible. However, when the aperture of a lens is enlarged, a plurality of lenses are needed for an aberration correction of a lens. Therefore, there may occur a problem that as the weight of an optical system including a lens increases, the manufacturing cost increases, and portability decreases, etc. Further, generally, setting the F value to 1 or less is very difficult to do from the viewpoint of aberration correction. Contrary thereto, the solid-state image pickup device 1A according to the present embodiment includes the lens section 3 having a plurality of lenses 3a. When a plurality of light lenses 3a having a large F value are used, it is possible to improve an effective brightness of an optical system and bring the F value close to zero. For example, the lens section 3 in which lenses 3a having an F value of 1.4 are arranged in three rows×three columns has an effective F value of 0.47.

Further, there are always some defective pixels having a large dark current in the solid-state image pickup device. It is not possible to use the electrical signal provided from these pixels for integrating the images. Therefore, there is a need for complementation by using the electrical signal provided from the pixel around the defective pixel, and thus, the information is missing. When the information is missing, it is not possible to detect a minute object, for example. Contrary thereto, the solid-state image pickup device 1A according to the present embodiment has a plurality of the pixel arrays P, and thus, it is possible to obtain a plurality of pieces of image data in which a subject image is imaged. Therefore, the electrical signal in the defective image need not be complimented, and thus, it is possible to prevent information from missing.

Second Embodiment

A solid-state image pickup device 1B according to a second embodiment will be described. The solid-state image pickup device 1B differs from the solid-state image pickup device 1A in that a coefficient calculation section 15 is provided instead of the selection section 12. The configuration of the image pickup section is similar to that of the image pickup section 2 according to the first embodiment, and thus, a detailed description thereof will be omitted. The coefficient calculation section 15 will be described in detail, below.

Figure 12:
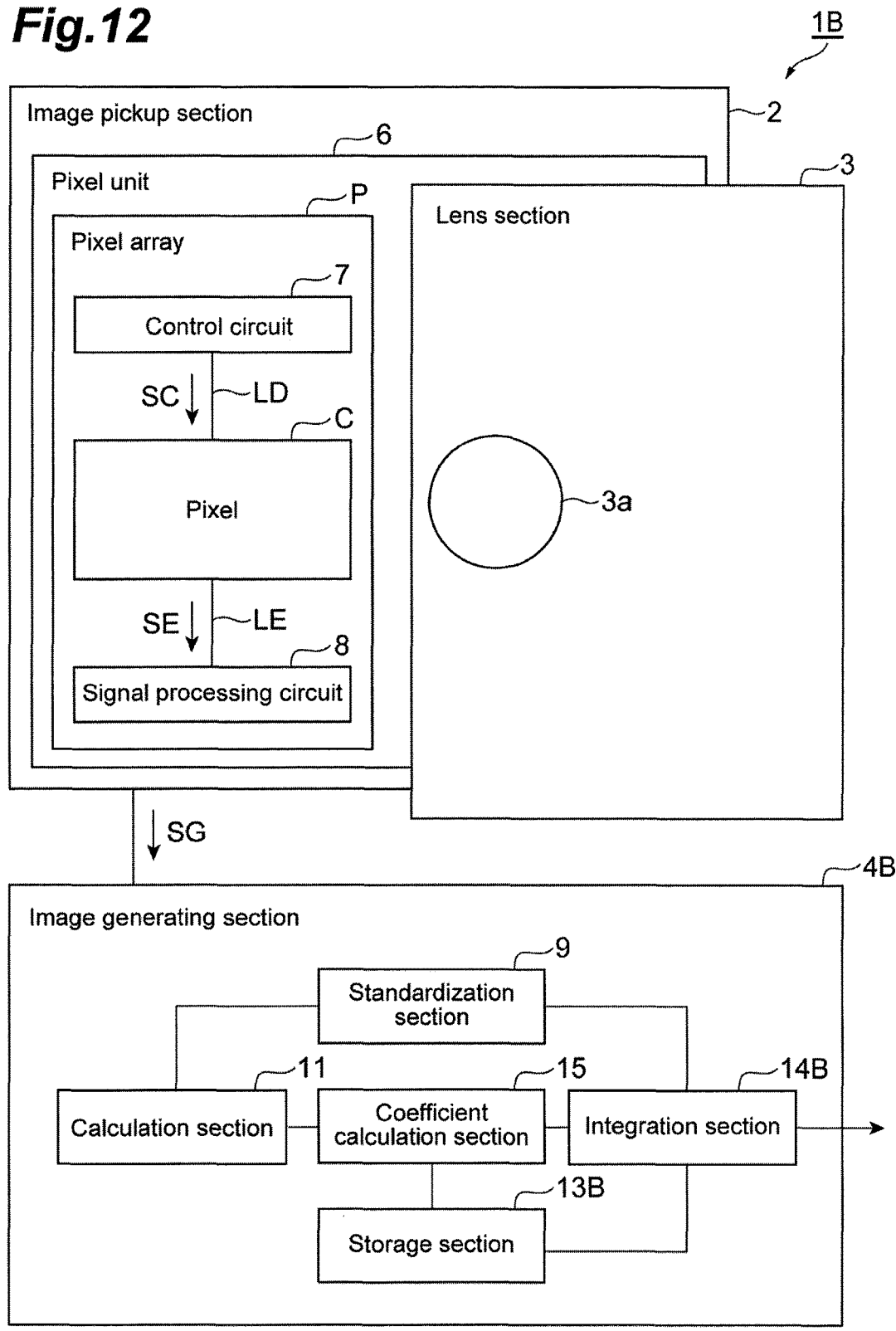
FIG. 12 is a diagram showing the configuration of a solid-state image pickup device according to a second embodiment.

FIG. 12 is a diagram showing the configuration of the solid-state image pickup device 1B according to the second embodiment, which is a two-dimensional image sensor. As shown in FIG. 12, the solid-state image pickup device 1B includes the image pickup section 2, the lens section 3, and an image generating section 4B. The image generating section 4B includes the standardization section 9, the calculation section 11, the coefficient calculation section 15, a storage section 13B, and an integration section 14B. The coefficient calculation section 15 calculates, on the basis of the variance of the noise output from the calculation section 11, a weight coefficient $w_i$ so that the variance of the average value in the pixel C corresponding to one another in each image pickup region T is minimized. The calculated weight coefficient $w_i$ is output to the storage section 13B and stored therein. The storage section 13B stores information used for integrating the image signals SG output from the image pickup section 2. The information used for integrating the image signals SG in the present embodiment is a weight coefficient multiplied with the electrical signal of each pixel C. The integration section 14B integrates, on the basis of the information stored in the storage section 13B, the image signals SG output from the image pickup section 2, into one piece of image data.

Figure 13:
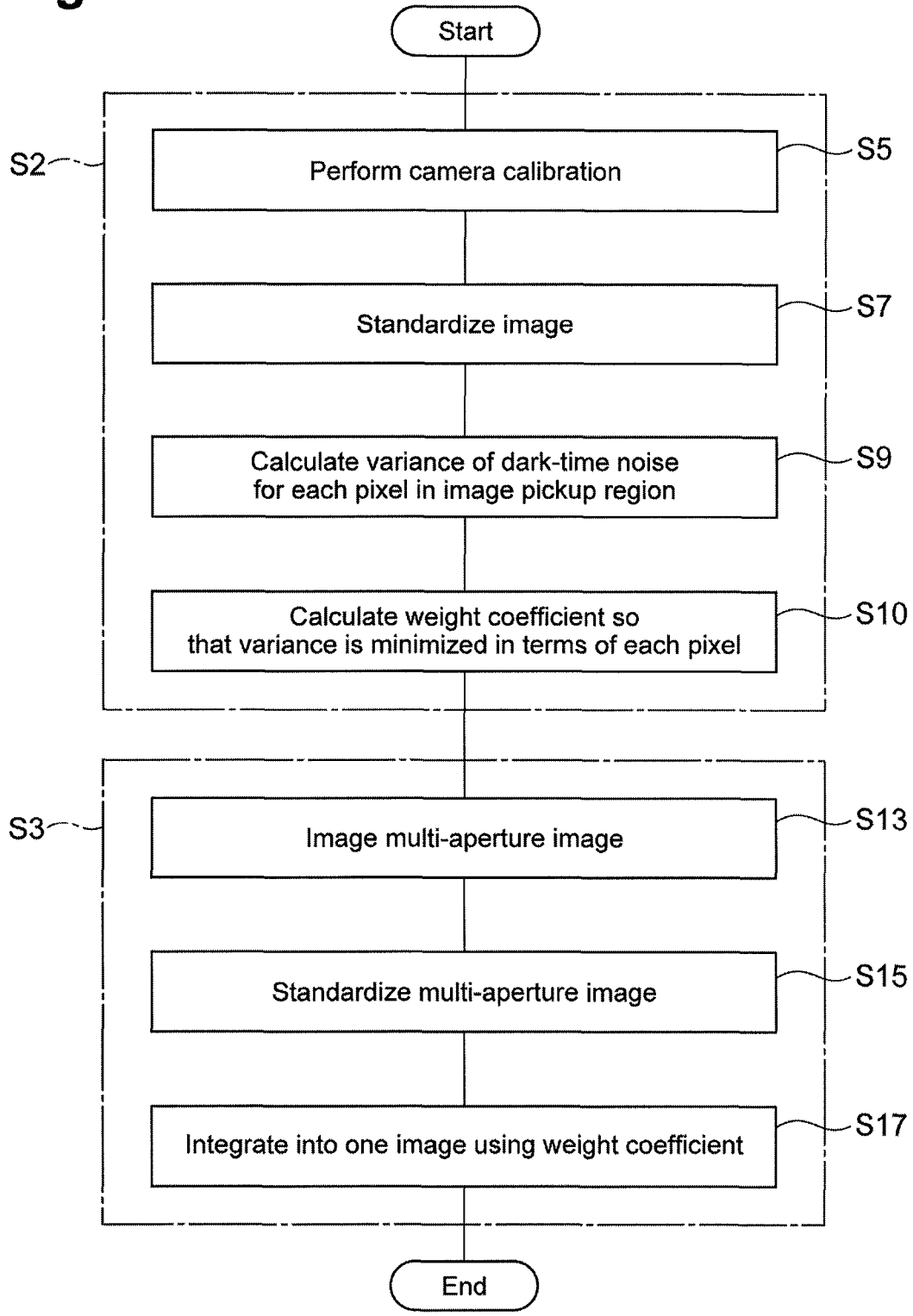
FIG. 13 is a flowchart for describing a processing flow of the second embodiment.

FIG. 13 is a flowchart for describing a processing flow of the second embodiment. The processing flow in the second embodiment differs from the first embodiment in that, at the pre-treatment step S2, the processing flow has, instead of the step (step S9) of calculating the variance of the dark-time noise for each pixel C of the dark-time image G in the first embodiment, a step (step S10) of calculating the weight coefficient so that the variance of the average value is minimized in terms of each pixel C.

In the processing of the second embodiment, implementation of a camera calibration (step S5), standardization of the dark-time image G (step S7), and calculation of the variance of the dark-time noise for each pixel C in the image pickup region T (step S9) are performed. Next, the weight coefficient $w_i$ is calculated (step S10). This step S10 is mainly executed by the coefficient calculation section 15 of the image generating section 4B. At step S10, as shown in the following formula (5), a value obtained when a variance $\sigma_i^2$ is multiplied with the weight coefficients $w_i$ are averaged across all the corresponding pixels C, and each weight coefficient $w_i$ which allows the average value to be minimized is calculated. The weight coefficient $w_i$ multiplied with the variance $\sigma_i^2$ of each pixel C is calculated according to the following formula (6). It is noted that the weight coefficient $w_i$ satisfies the following formula (7).

[Formula 5]

$$\tilde{w}' = \underset{w'}{\mathrm{argmin}} \sum_{\forall i \in A'} w_i^2 \cdot \sigma_i^2 \quad (5)$$

[Formula 6]

$$\tilde{w}_i = \frac{\frac{1}{\sigma_i^2}}{\sum_{\forall j \in A'} \frac{1}{\sigma_j^2}} \quad (6)$$

[Formula 7]

$$\sum_{\forall i \in A'} w_i = 1 \quad (7)$$

At the post-treatment step S3, the multi-aperture images imaged by the image pickup section 2 is combined into one image, on the basis of the information acquired at the pre-treatment step S2. First, the solid-state image pickup device 1B is used and the multi-aperture image is thereby imaged (step S13). Next, the image in each pixel array P is subject to standardization processing (step S15). Then, on the basis of the image data in each standardized pixel array P and the weight coefficient $w_i$ stored in the storage section 13B, the multi-aperture images are integrated into one image (step S17). This step S17 is mainly executed in the integration section 14B of the image generating section 4B. The combined pixel value is calculated according to the following formula (8), where $P_i$ denotes the pixel value of each pixel array P. Through the above steps, the image in which noise is reduced is obtained.

[Formula 8]

$$P' = \sum_{i \in A'} w_i \cdot P_i \quad (8)$$

In the solid-state image pickup device 1B according to the present embodiment, it is also possible to obtain an effect similar to that in the solid-state image pickup device 1A.

Third Embodiment

Figure 14:
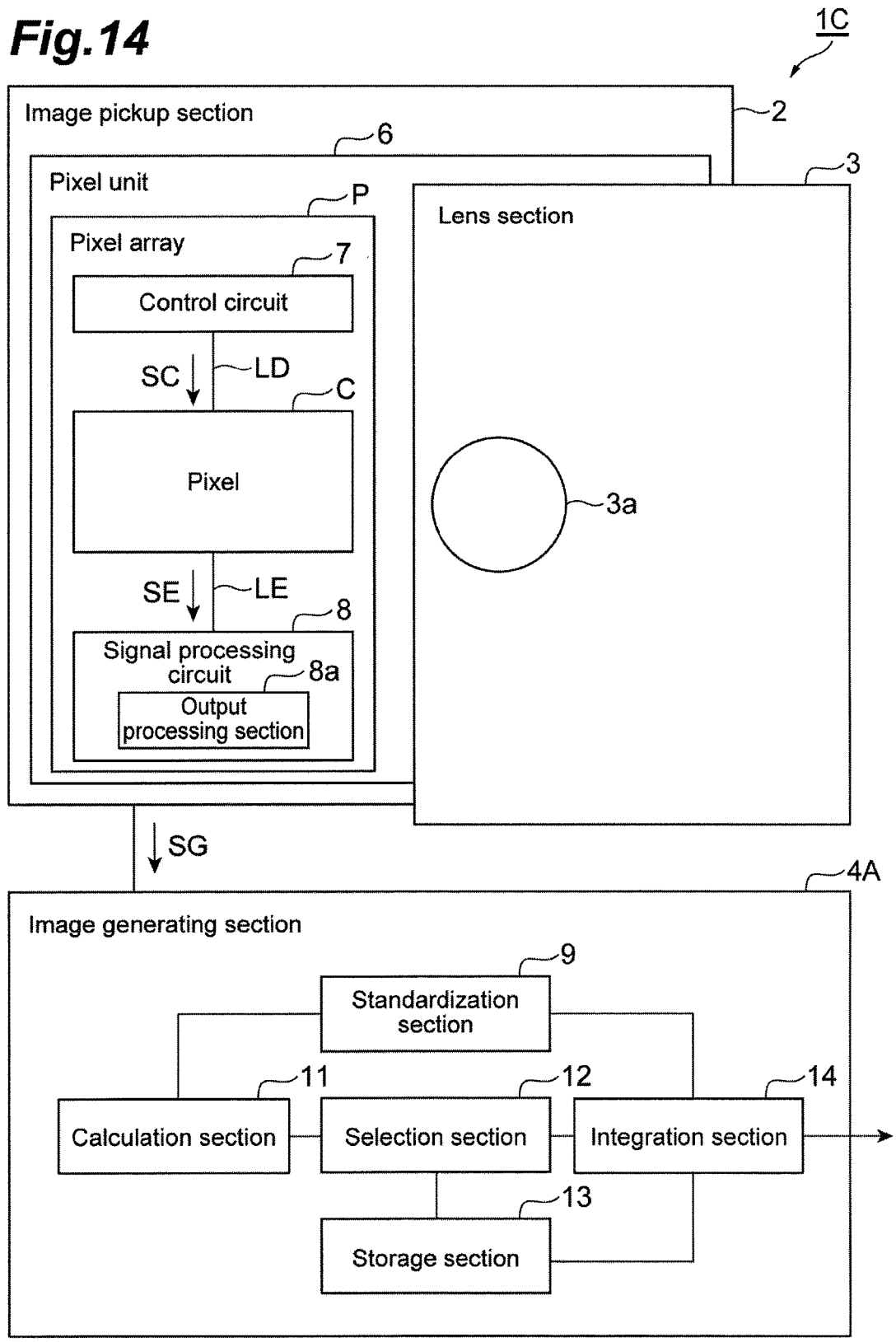
FIG. 14 is a diagram showing the configuration of a solid-state image pickup device according to a third embodiment.

A solid-state image pickup device 1C according to a third embodiment will be described. FIG. 14 is a diagram showing the configuration of the solid-state image pickup device 1C according to the third embodiment, which is a two-dimensional image sensor. The solid-state image pickup device 1C differs from the solid-state image pickup device 1A in that the signal processing circuit 8 has an output processing section 8a. The output processing section 8a processes electrical signals SEa and SEb provided from two output sections 18a and 18b, described later. Processing contents will be described later.

Figure 15:
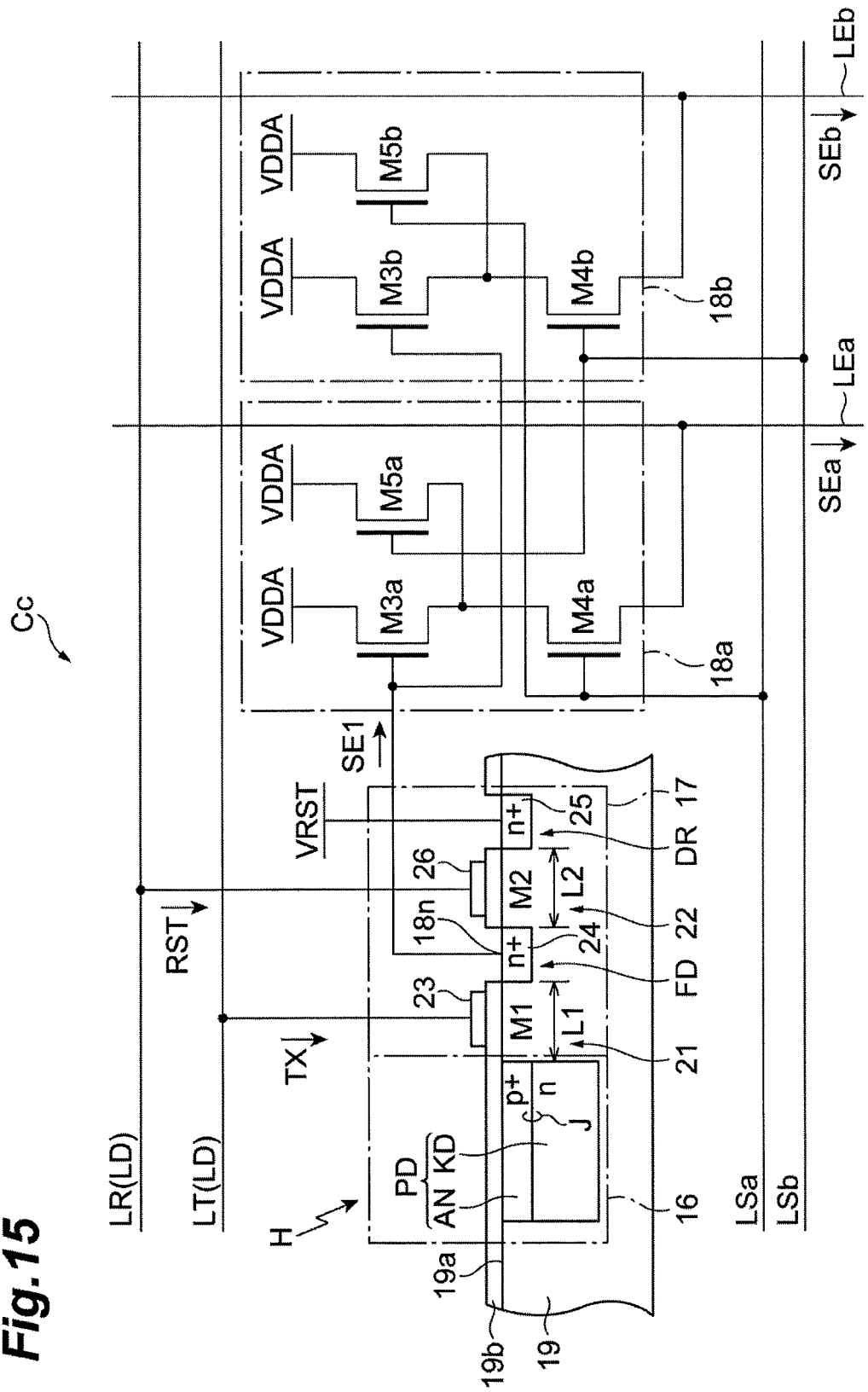
FIG. 15 is a diagram showing one example of a structure of a pixel contained in the solid-state image pickup device according to the third embodiment.

FIG. 15 is a diagram showing one example of a structure of a pixel Cc contained in the solid-state image pickup device 1C according to the third embodiment. As shown in FIG. 15, the solid-state image pickup device 1C differs from the solid-state image pickup device 1A according to the first embodiment mainly in that a pixel 3C has the two output sections 18a and 18b. The pixel Cc has a first output section 18a and a second output section 18b. The first output section 18a includes a transistor M5a as well as transistors M3a and M3b. The transistor M5a is used for reducing a parasitic capacity provided in the transistor M3a. A gate of the transistor M5a is connected to a gate of a transistor M4b, described later. A drain of the transistor M5a is connected to the high-potential power source VDDA. A source of the transistor M5a is connected to a source of the transistor M3a.

The second output section 18b includes three transistors, that is, transistors M3b, M4b, and M5b. A gate of the transistor M3b is connected to the floating diffusion section FD, a drain thereof is connected to the high-potential power source VDDA, and a source thereof is connected to a drain of the transistor M4b and a source of the transistor M5b. A gate of the transistor M4b is connected to a gate of the transistor M5a and a driving line LSb, a drain thereof is connected to the source of the transistor M3b, and a source thereof is connected to a signal line LEb. A gate of the transistor M5b is connected to a gate of the transistor M4a and a driving line LSa, a drain thereof is connected to the high-potential power source VDDA, and a source thereof is connected to a source of the transistor M3b and a drain of the transistor M4b.

A readout operation of the electrical signals SEa and SEb by the first and second output sections 18a and 18b will be described. First, a control signal is input via the first driving line LSa to the transistor M4a of the first output section 18a and the transistor M5b of the second output section 18b. At this time, the first electrical signal SEa is output to a signal line LEa via the first output section 18a. Further, in the second output section 18b, a high voltage is applied to the source of the transistor M3b, which is a readout amplifier, and thus, a region immediately below the gate of the transistor M3b is made depleted. Next, a control signal is input via the second driving line LSb to the transistor M5a of the first output section 18a and the transistor M4b of the second output section 18b. At this time, the second electrical signal SEb is output to the signal line LEb via the second output section 18b. Further, in the first output section 18a, a high voltage is applied to the source of the transistor M3a, which is a readout amplifier, and thus, a region immediately below the gate of the transistor M3a is made depleted.

Each of the transistors M3a to M5a and M3b to M5b configuring the first and second output sections 18a and 18b has a respectively different noise. Therefore, the noise contained in the first electrical signal SEa read out from the first output section 18a and the noise contained in the second electrical signal SEb read out from the second output section 18b are acquired to determine a combination that may reduce noise. For example, the first electrical signal SEa may be used alone, the second electrical signal SEb may be used alone, and the first and second electrical signals SEa and SEb may be subject to arithmetical mean. These processing contents are determined in advance for each pixel Cc, and stored in the signal processing circuit 8. When the electrical signals SEa and SEb are read out from each pixel Cc, a predetermined processing content is executed. This processing is executed mainly in the output processing section 8a of the signal processing circuit 8.

Therefore, in the pixel Cc having the first and second output sections 18a and 18b, the first electrical signal SEa is provided from the first output section 18a and the second electrical signal SEb is provided from the second output section 18b.

FIG. 16 shows the transistors M3a and M3b, which are readout amplifiers. The M3a and M3b include a gate 71g, a source 71s, and a drain 71d. Here, when a region immediately below the gate 71g of the transistors M3a and M3b, which are readout amplifiers, is not made depleted, a capacity 73 exists as is because a channel 72 exists immediately below the gate 71. The capacity 73 may inhibit a reduction in noise (see FIG. 16(a)). On the other hand, when a region immediately below the gate 71g is made depleted by applying a voltage to the source 71s of the transistors M3a and M3b (see FIG. 16(b)), a capacity 74 of the gate 71g is connected in series to a capacity of a depletion layer 76. When the capacities are connected in series, the combined capacity seemingly decreases. Therefore, it is possible to reduce noise. Thus, in the solid-state image pickup device 1C according to the third embodiment, a high voltage is applied to the source of the transistor of the output section not used for reading out so that a region immediately below the gate is made depleted, whereby it is possible to inhibit a decrease in conversion gain as a result of an increase in parasitic capacity of a potential node of the floating diffusion section FD, that is, to inhibit an increase in input referred noise.

In the pixel Cc of the solid-state image pickup device 1C, when the first electrical signal SEa is read out from the first output section 18a, a region immediately below the gate of the transistor M3b of the second output section 18b not used for reading out is made depleted. Therefore, it is possible to reduce noise of the first electrical signal SEa. Further, when the second electrical signal SEb is read out from the second output section 18b, a region immediately below the gate of the transistor M3a of the first output section 18a not used for reading out is made depleted. Therefore, it is possible to reduce noise of the second electrical signal SEb. Therefore, according to the solid-state image pickup device 1C, it is possible to obtain an image where noise is further reduced.

Modification 1

Figure 17:
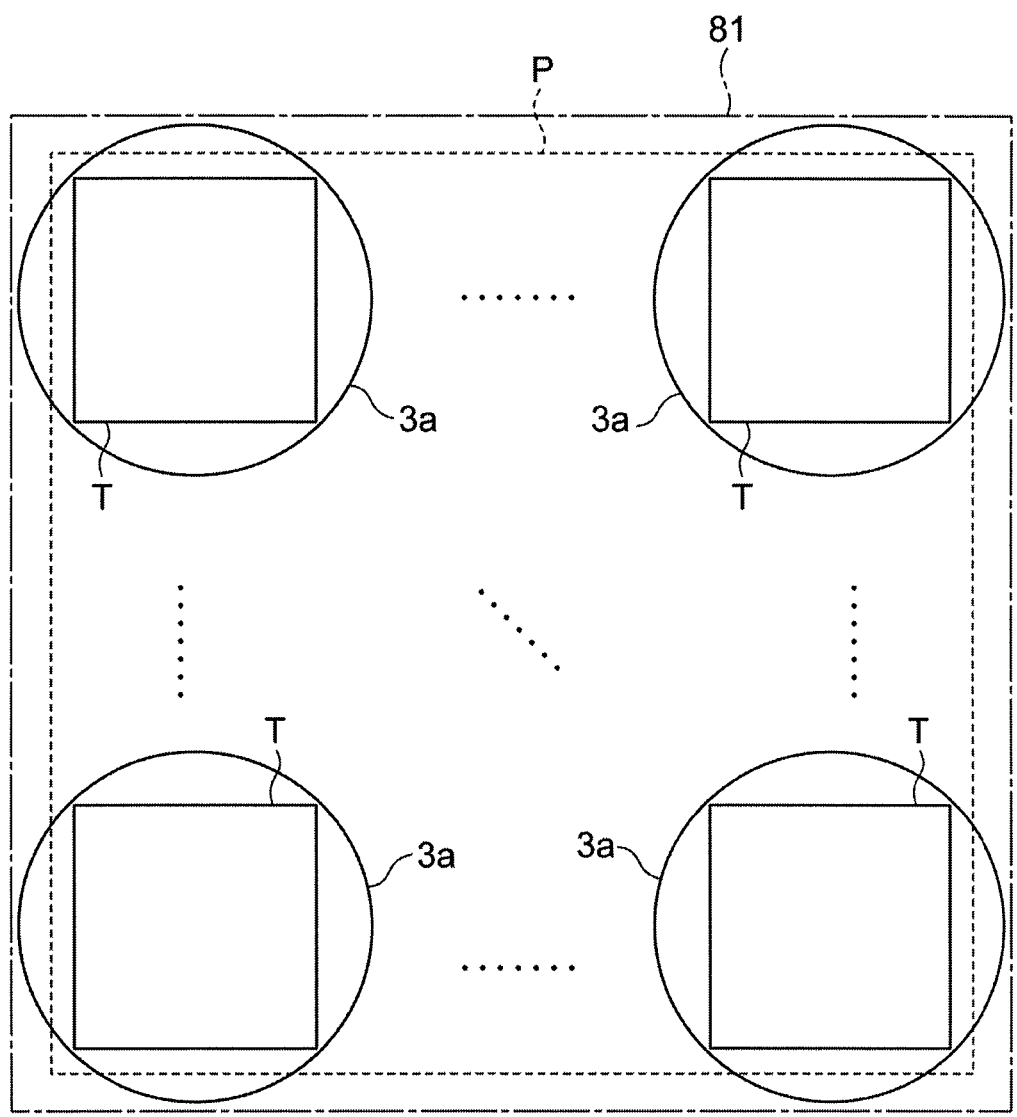
FIG. 17 is a diagram for describing a modification.

The solid-state image pickup device 1A of the present invention is not limited to the above-described embodiments. In the above-described first to third embodiments, the pixel array P has one image pickup region T and the image pickup section 2 has a plurality of the pixel arrays P. However, in the solid-state image pickup device according to the present invention, the pixel array P may have a plurality of image pickup regions T and the image pickup section 2 may have one pixel array P. FIG. 17 is a diagram showing the pixel array P in the image pickup section 2 and the image pickup region T in a modification 1. An image pickup section 81 of the modification 1 has one pixel array P. Further, on the pixel array P, a plurality of lenses 3a are disposed. The plurality of image pickup regions T correspond to the lenses 3a. According to such a configuration, a plurality of the image pickup regions T in which a subject image is formed by the lens section 3 are set to one pixel array P. Therefore, by the electrical signal SE provided from the image pickup section 2, one image is obtained. Then, in this image, a plurality of subjects are photographed. That is, in the modification 1, one image sensor is divided and used. Even when such a configuration is used, it is possible to obtain an image where noise is reduced.

Modification 2

Figure 18:
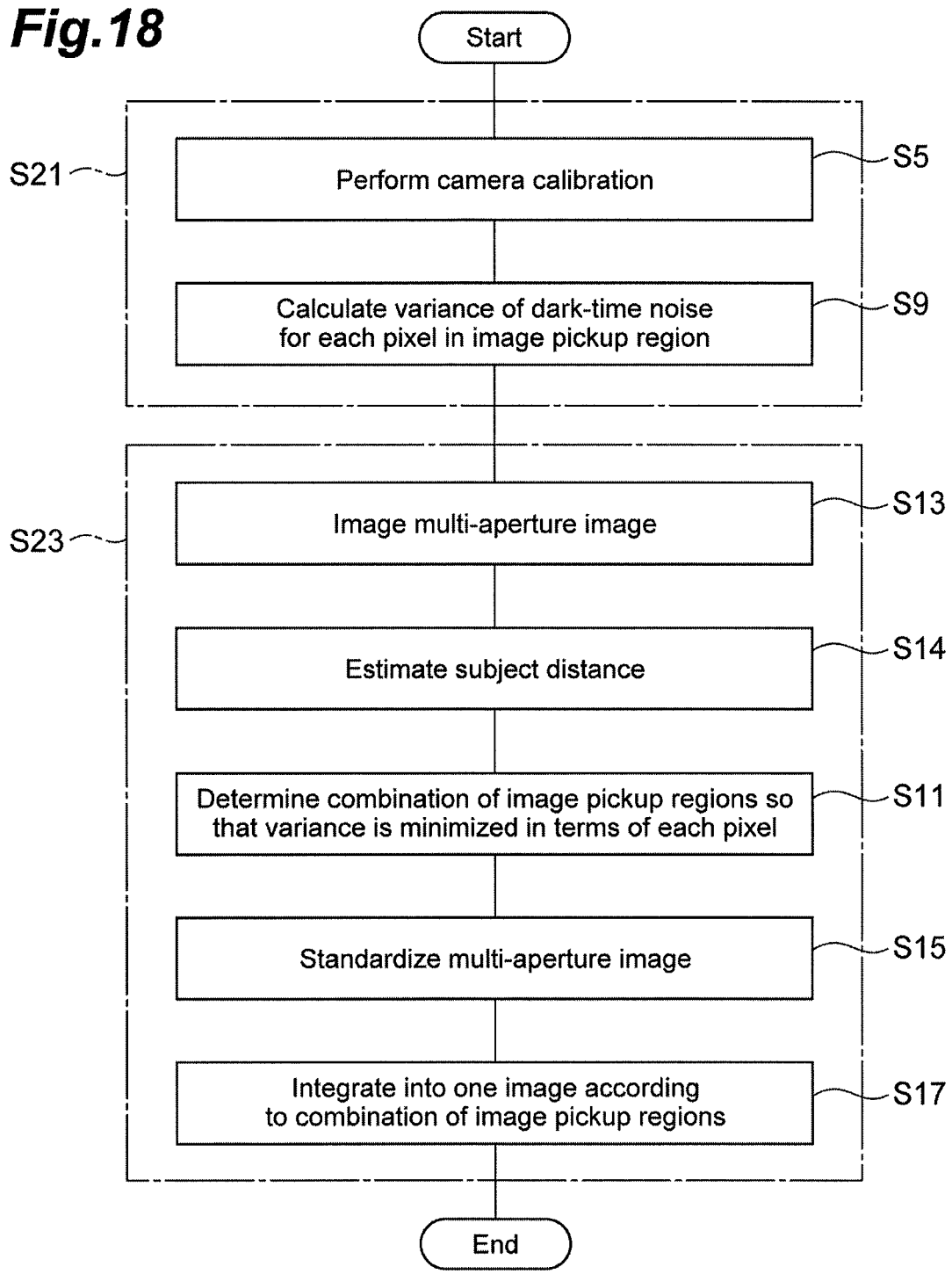
FIG. 18 is a flowchart for describing the modification.

Further, in the above-described first to third embodiments, the distance between the solid-state image pickup devices 1A to 1C and the subject is fixed. However, the distance between the solid-state image pickup devices 1A to 1C and the subject may not necessarily be fixed, and may change to any length. FIG. 18 is a diagram showing a processing flow according to a modification 2 when the distance between the solid-state image pickup devices 1A to 1C and the subject changes. The processing flow includes a pre-treatment step (step S21) implemented before photographing and a post-treatment step (step S23) implemented at the time of photographing.

The processing flow of the modification 2 differs from the processing flow in the first embodiment in that step S11 of determining a combination of the image pickup regions T is not implemented at the pre-treatment step S21 but implemented at the post-treatment step S23. Further, the processing flow of the modification 2 differs from the processing flow in the first embodiment in that the post-treatment step S23 has step S14 of estimating a distance between the solid-state image pickup devices 1A to 1C and the subject.

When the distance between the solid-state image pickup devices 1A to 1C and the subject changes while the multi-aperture image is photographed, the pixel C corresponding to one another in each image pickup region T changes depending upon a photographing situation. Therefore, each time the multi-aperture image is photographed, a correspondency between the pixels C in each image pickup region T is calculated, and on the basis of the result, a combination of the image pickup regions T which allows the variance of the average value of the dark-time noise to be minimized for each pixel C is determined. Further, at step S14, alignment may be implemented among the images imaged for each image pickup region T. In this case, a magnification rate is corrected on the basis of a spectrum after Fourier transform and log-polar transform. Further, a phase only correlation method and a method of using a feature point may be employed for the alignment. Further, at step S14 of estimating the distance between the solid-state image pickup devices 1A to 1C and the subject, a depth map may be used.

Modification 3

Further, in the first to third embodiments, the pixel C has the floating diffusion section FD decreased in capacity and the microfabricated transistors M3 and M4. However, the pixel C provided in the solid-state image pickup device 1A is not limited to the pixel including the floating diffusion section FD decreased in capacity and the microfabricated transistors M3 and M4. Further, MOSFET having the same channel length as the transistors M1 and M2 may be used for the transistors M3 and M4. In the solid-state image pickup device having such a pixel, it is also possible to obtain an image where noise is reduced.

Modification 4

Further, in the first to third embodiments, processing is performed where shot noise due to the dark current of the photodiode PD and amplifier noise in the signal readout section 17 and the output section 18 are added with power and collectively considered as dark-time noise. According to such processing, a selective average method described in the first embodiment and the weighted average method described in the second embodiment may be both applied to the step of averaging the electrical signals for each pixel. On the other hand, the noise due to the amplifier and the noise due to the dark current may be separately processed. First, the noise due to the amplifier and the noise due to the dark current are separated by changing an accumulation time. Next, by using the selective average method with a focus on the noise due to the amplifier, the pixel array P used for combining the images is selected. Further, by using the selective average method with a focus on the noise due to the dark current, the pixel array P used for combining the images is selected. Then, the pixel array P common in the pixel array P selected with a focus on the noise due to the amplifier and the pixel array P selected with a focus on the noise due to the dark current is used for combining the images.

Example 1

In the solid-state image pickup device according to the present invention, an effect of reducing noise was confirmed through simulation. A model of the solid-state image pickup device used for the simulation had nine pixel arrays P where the image pickup sections 2 were arranged in three rows× three columns. Each of the pixel arrays P had pixels C arranged in 200 rows×200 columns. It was assumed that each pixel C had an actually measured noise value provided in a low noise image sensor developed by the inventors. FIG. 19(d) shows a simulation image obtained by adding photonshot noise and the actually measured sensor noise to the original image data.

As a method of averaging the electrical signals for each pixel C corresponding to one another, which was implemented for integrating the images, the selective average method used in the solid-state image pickup device 1A in the first embodiment was employed. Here, the selective average method is a method in which, when the electrical signals SE are averaged, one or more pixel arrays P are selected so that the variance of each pixel C after the integration is minimized and an average value of the pixel values of the selected pixel array P is a pixel value of the integrated image. Further, as a comparative example, as a method of averaging the electrical signals for each pixel C, an arithmetical average method and a minimum noise selection method were used. Here, the arithmetical average method is a method in which, when the electrical signals SE are averaged, the pixel values of all the pixel arrays P are used and the average value of the pixel value is the pixel value of the integrated image. Further, the minimum noise selection method is a method in which only the pixel of the pixel array where the variance is the smallest is selected, and thus, the pixel value of the selected pixel is the pixel value of the integrated image.

FIG. 19(a) is an image processed by using the arithmetical average method. When FIG. 19(a) is confirmed, the noise was generally reduced; however, the presence of salt-and-pepper noise due to the RTS noise or shot noise of the dark current was confirmed. FIG. 19(b) is an image processed by using the minimum noise selection method. When FIG. 19(b) is confirmed, there was no salt-and-pepper noise; however, it was confirmed that the noise level was generally high.

On the other hand, FIG. 19(c) shows an image processed by using the selective average method. As shown in FIG. 19(c), when the image is processed by using the selective average method, noise is reduced more than the comparative example, and no noise of the salt-and-pepper noise due to the RTS noise or the shot noise of the dark current was confirmed. Therefore, it was known that it was possible to reduce more noise than the method in the comparative example.

Example 2

In the solid-state image pickup device according to the present invention, the distribution of noise was confirmed through simulation. A model of the solid-state image pickup device used for the simulation is similar to that in the example 1. Further, as in the example 1, the distribution of noise when the arithmetical average method and the minimum noise selection method were used, as a comparative example, was confirmed.

Figure 20:
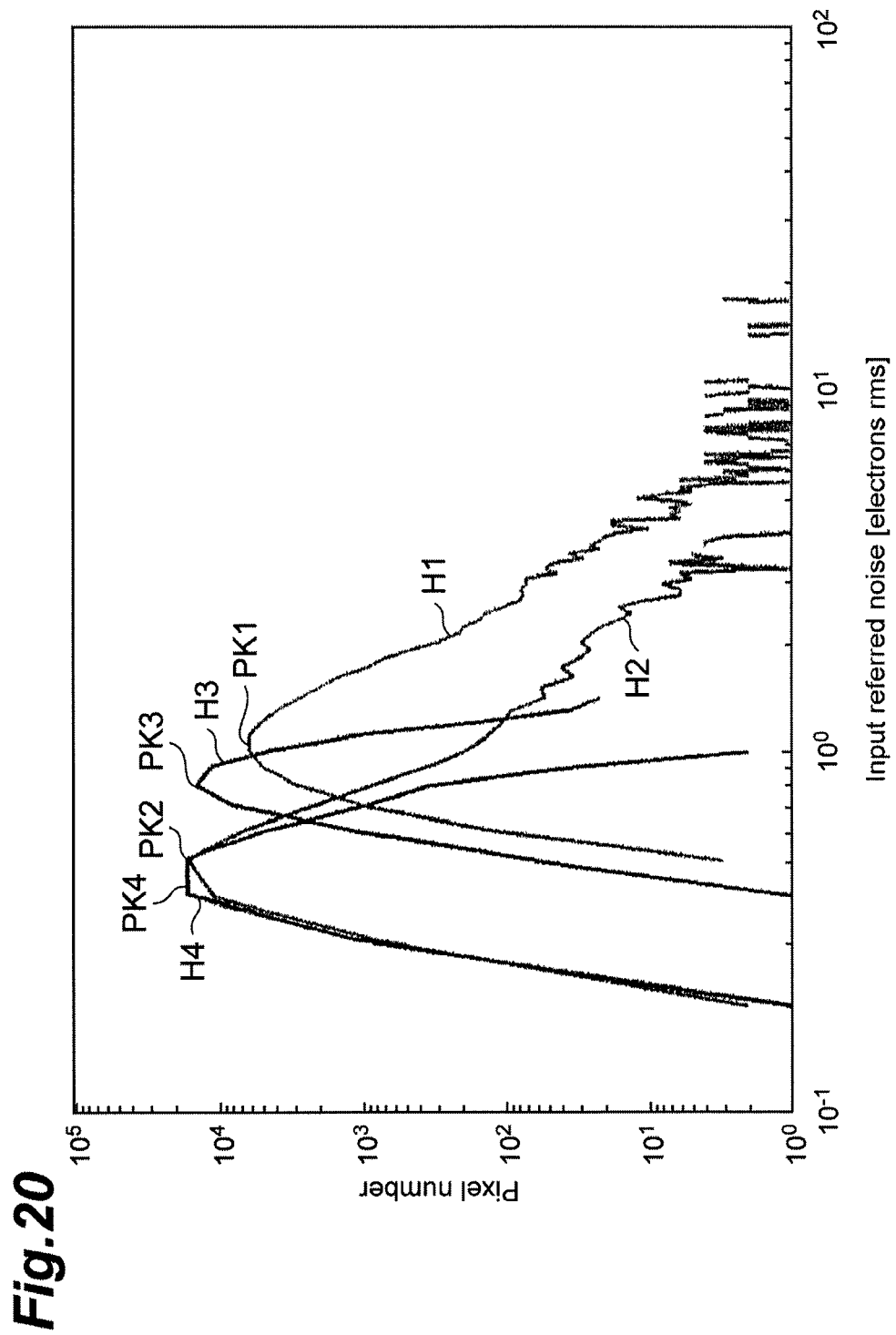
FIG. 20 is a diagram for describing an example.

FIG. 20 shows the distribution of input referred noise. In FIG. 20, the horizontal axis represents the input referred noise and the vertical axis represents the number of pixels having the input referred noise. Here, the input referred noise is noise obtained when the magnitude of noise in the electrical signal SE output from the image pickup section 3 is discounted back into the gain of a source follower amplifier, etc., so that the resultant value can be expressed in terms of the number of charges. The input referred noise is calculated by discounting back an amount of noise, by a total gain obtained, as the image signal SG, until output from the image pickup section 2, from the charge generated in the photoelectric conversion section 16.

A graph H1 in FIG. 20 shows a distribution of noise present in an image on which averaging processing is not yet performed. In the graph H1, a peak PK1 of the distribution of noise was 1.02 electrons rms. Further, in the graph H1, it was confirmed that there was a pixel having a relatively large noise, that is, a noise level of about 10 electrons rms.

A graph H2 in FIG. 20 shows a distribution of noise present in an image on which processing by the arithmetical average method has been performed. In the graph H2, a peak PK2 of the distribution of noise is 0.47 electrons rms, and it was confirmed that the noise was reduced more than before the processing. However, in the graph H2, it was confirmed that there was a pixel having noise with a magnitude of 1 to 10 electrons rms.

A graph H3 in FIG. 20 shows a distribution of noise present in an image on which processing by the minimum noise selection method has been performed. In the graph H3, a peak PK3 of the distribution of noise is 0.84 electrons rms, and it was confirmed that the noise was reduced more than before the processing.

A graph H4 in FIG. 20 shows a distribution of noise present in an image on which processing by the selective average method has been performed. In the graph H4, a peak PK4 of the distribution of noise is 0.46 electrons rms, and it was confirmed that the noise was reduced more than before the processing. Further, a peak input referred noise value was comparable to that in the arithmetical average method. On the other hand, in the graph H4, the noise with a magnitude of 1 to 10 electrons rms which was confirmed in the graph H2 using the arithmetical average method was not confirmed. Therefore, it was known that the processing according to the selective average method had the best performance in reducing the noise. Further, it was also known that it was possible to reduce noise that was below 1 electrons rms.

Example 3

In the solid-state image pickup device according to the present invention, the distribution of noise when the selective average method was used was confirmed through another simulation other than the example 2. A model of the solid-state image pickup device used for the simulation is similar to that in the example 1. As a comparative example, distributions of noise when the arithmetical average method, the minimum noise selection method, and a median value selection method were used were confirmed. Further, the distribution of noise assumed in the image pickup device with a single aperture structure having a brightness comparable to a combined F value realized by the multi-aperture structure was also confirmed.

Figure 21:
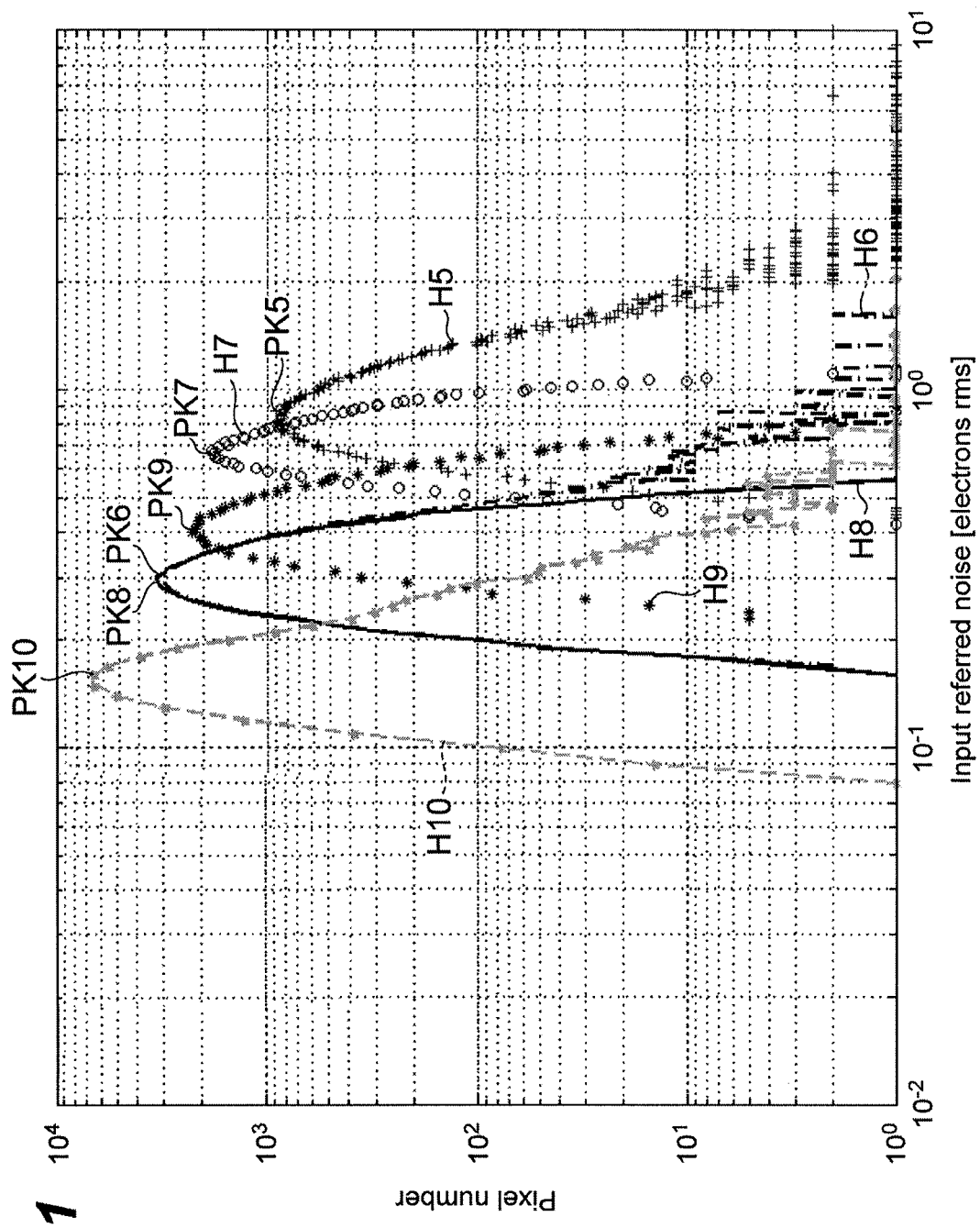
FIG. 21 is a diagram for describing an example.

FIG. 21 shows the distribution of input referred noise. In FIG. 21, the horizontal axis represents the input referred noise standardized by an effective optical gain and the vertical axis represents the number of pixels having the input referred noise.

A graph H5 shows a distribution of noise present in an image on which averaging processing is not yet performed. A peak PK5 of the distribution of noise was 0.81 electrons rms. A graph H6 shows a distribution of noise present in an image on which processing by the arithmetical average method has been performed. A peak PK6 of the distribution of noise was 0.30 electrons rms. A graph H7 shows a distribution of noise present in an image on which processing by the minimum noise selection method has been performed. A peak PK7 of the distribution of noise was 0.68 electrons rms. A graph H8 shows a distribution of noise present in an image on which processing by the selective average method has been performed. A peak PK8 of the distribution of noise was 0.30 electrons rms.

A graph H9 shows a distribution of noise present in an image on which processing by the median value selection method of selecting a median value when the images are combined has been performed. A peak PK9 of the distribution of noise was 0.40 electrons rms. It was known that the RTS noise has been removed; however, the peak PK9 of the noise was larger than the peak PK8 of the distribution of noise in the selective average method.

A graph H10 shows a distribution of noise assumed in the image pickup device with a single aperture structure. A peak PK10 of the distribution of noise was 0.14 electrons rms. It was known that although the noise peak PK10 was the smallest; however, the RTS noise remained. It is anticipated that as the microfabrication of pixels is further advanced, a component of this RTS noise becomes larger and the image quality further deteriorates.

REFERENCE SIGNS LIST 1A, 1B, 1C . . . solid-state image pickup device, 2, 81 . . . image pickup section, 3 . . . lens section, 3a . . . lens, 4A, 4B . . . image generating section, 11 . . . calculation section, 12 . . . selection section, 13, 13B . . . storage section, 14, 14B . . . integration section, 15 . . . coefficient calculation section, 16 . . . photoelectric conversion section, 18 . . . output section, 18a . . . first output section, 18b . . . second output section, C, Cc . . . pixel, DR . . . discharge section, FD . . . floating diffusion section, H . . . light, M1, M2, M3, M3a, M3b, M4, M4a, M4b, M5a, M5b . . . transistor, P . . . pixel array, SE, SE1, SEa . . . electrical signal, T . . . image pickup region.

The invention claimed is:

1. A solid-state image pickup device, comprising:
an image pickup section having a plurality of pixel arrays in which pixels for providing, via a transistor, an electrical signal corresponding to received light are two-dimensionally arranged;
a lens section having a plurality of lenses arranged on the pixel array; and
an image generating section for generating an image by using the electrical signal, wherein
the image pickup section has a plurality of the pixel arrays each including one image pickup region onto which a subject image is formed by the lens section,
the image generating section generates the image by averaging the electrical signals for each of the pixels corresponding to one another among the image pickup regions, in order to reduce noise present in the electrical signal, and
the image generating section includes:
a calculation section for calculating, for each of the pixels corresponding to one another among the image pickup regions, a variance of the electrical signal provided from the pixel;
a selection section for selecting, on the basis of the variances output from the calculation section, a combination of the image pickup regions so that a variance of the average value of the pixels, each pixel corresponding to one another among the image pickup regions, is minimized; and
an integration section for integrating the images by averaging, on the basis of the combination of the image pickup regions, the electrical signal for each of the pixels corresponding to one another among the image pickup regions.

2. The solid-state image pickup device according to claim 1, wherein the image pickup section has M (M is an integer of 2 or more) pixel arrays,
the pixel includes:
a photoelectric conversion section for generating a charge corresponding to received light;
a floating diffusion section arranged adjacent to the photoelectric conversion section, where the charge is transferred to the floating diffusion section;

a discharge section to which the charge transferred to the floating diffusion section is discharged; and an output section for providing, via the transistor, the electrical signal corresponding to a potential of the floating diffusion section, where the output section is connected to the floating diffusion section, and a conversion gain in the image pickup section having a plurality of the pixel arrays is set to be M or more times the conversion gain in the image pickup section having the one pixel array.

3. The solid-state image pickup device according to claim 2, wherein the transistor is MOSFET, and a channel length of the MOSFET is shorter than a distance between the photoelectric conversion section and the floating diffusion section or shorter than a distance between the floating diffusion section and the discharge section.

4. A solid-state image pickup device, comprising:

an image pickup section having a plurality of pixel arrays in which pixels for providing, via a transistor, an electrical signal corresponding to received light are two-dimensionally arranged;

a lens section having a plurality of lenses arranged on the pixel array; and an image generating section for generating an image by using the electrical signal, wherein the image pickup section has a plurality of the pixel arrays each including one image pickup region onto which a subject image is formed by the lens section, the image generating section generates the image by averaging the electrical signals for each of the pixels corresponding to one another among the image pickup regions, in order to reduce noise present in the electrical signal, the image pickup section has M (M is an integer of 2 or more) pixel arrays, the pixel includes:

a photoelectric conversion section for generating a charge corresponding to received light;

a floating diffusion section arranged adjacent to the photoelectric conversion section, where the charge is transferred to the floating diffusion section;

a discharge section to which the charge transferred to the floating diffusion section is discharged; and an output section for providing, via the transistor, the electrical signal corresponding to a potential of the floating diffusion section, where the output section is connected to the floating diffusion section, and a conversion gain in the image pickup section having a plurality of the pixel arrays is set to be M or more times the conversion gain in the image pickup section having the one pixel array.

5. The solid-state image pickup device according to claim 4, wherein the transistor is MOSFET, and a channel length of the MOSFET is shorter than a distance between the photoelectric conversion section and the floating diffusion section or shorter than a distance between the floating diffusion section and the discharge section.

6. The solid-state image pickup device according to claim 4, wherein the image generating section includes:

a coefficient calculation section for providing a weight coefficient applied to each of the electrical signals provided from the pixel; and an integration section for integrating the images by averaging values obtained by multiplying the weight coefficient by a value of the electrical signal provided from the pixel, for each of the pixels corresponding to one another among the image pickup regions.

7. The solid-state image pickup device according to claim 5, wherein the image generating section includes:

a coefficient calculation section for providing a weight coefficient applied to each of the electrical signals provided from the pixel; and an integration section for integrating the images by averaging values obtained by multiplying the weight coefficient by a value of the electrical signal provided from the pixel, for each of the pixels corresponding to one another among the image pickup regions.

8. A solid-state image pickup device, comprising:

an image pickup section having one pixel array in which pixels for providing, via a transistor, an electrical signal corresponding to received light are two-dimensionally arranged;

a lens section having a plurality of lenses arranged on the pixel array; and an image generating section for generating an image by using the electrical signal, wherein the image pickup section has the one pixel array including a plurality of image pickup regions onto which a subject image is formed by the lens section, the image generating section generates the image by averaging the electrical signals for each of the pixels corresponding to one another among the image pickup regions, in order to reduce noise present in the electrical signal, and the image generating section includes:

a calculation section for calculating, for each of the pixels corresponding to one another among the image pickup regions, a variance of the electrical signal provided from the pixel;

a selection section for selecting, on the basis of the variances output from the calculation section, a combination of the image pickup regions so that a variance of the average value of the pixels, each pixel corresponding to one another among the image pickup regions, is minimized; and an integration section for integrating the images by averaging, on the basis of the combination of the image pickup regions, the electrical signal for each of the pixels corresponding to one another among the image pickup regions.

9. The solid-state image pickup device according to claim 8, wherein the pixel includes:

a photoelectric conversion section for generating a charge corresponding to received light;

a floating diffusion section arranged adjacent to the photoelectric conversion section, where the charge is transferred to the floating diffusion section;

a discharge section to which the charge transferred to the floating diffusion section is discharged; and an output section for providing, via the transistor, the electrical signal corresponding to a potential of the floating diffusion section, where the output section is connected to the floating diffusion section.

10. The solid-state image pickup device according to claim 9, wherein the transistor is MOSFET, and a channel length of the MOSFET is shorter than a distance between the photoelectric conversion section and the floating diffusion section or shorter than a distance between the floating diffusion section and the discharge section.

11. The solid-state image pickup device according to claim 8, wherein the image pickup section has no more than one pixel array.

\* \* \* \* \*